US009753964B1

(12) United States Patent
Marshall et al.

(10) Patent No.: US 9,753,964 B1
(45) Date of Patent: Sep. 5, 2017

(54) SIMILARITY CLUSTERING IN LINEAR TIME WITH ERROR-FREE RETRIEVAL USING SIGNATURE OVERLAP WITH SIGNATURE SIZE MATCHING

(71) Applicant: Acquire Media Ventures Inc., Roseland, NJ (US)

(72) Inventors: Jonathan A. Marshall, Montclair, NJ (US); Lawrence C. Rafsky, Scotch Plains, NJ (US)

(73) Assignee: ACQUIRE MEDIA VENTURES, INC., Roseland, NJ (US)

( * ) Notice: Subject to any disclaimer, the term of this patent is extended or adjusted under 35 U.S.C. 154(b) by 0 days.

(21) Appl. No.: 15/410,126

(22) Filed: Jan. 19, 2017

(51) Int. Cl.
*G06F 17/30* (2006.01)
(52) U.S. Cl.
CPC .. *G06F 17/30339* (2013.01); *G06F 17/30377* (2013.01)
(58) Field of Classification Search
CPC ............... G06F 17/30339; G06F 17/30377
See application file for complete search history.

(56) References Cited

U.S. PATENT DOCUMENTS

| 7,797,265 | B2 * | 9/2010 | Brinker | G06F 17/30707 |
| | | | | 382/226 |
| 7,865,505 | B2 | 1/2011 | Arasu et al. | |
| 8,655,878 | B1 * | 2/2014 | Kulkarni | G06F 17/30424 |
| | | | | 707/736 |
| 9,020,271 | B2 | 4/2015 | Deolalikar et al. | |

(Continued)

OTHER PUBLICATIONS

Jain AK (2010), "Data clustering: 50 years beyond K Means," Pattern Recog. Lett. 31(8):651 666.

(Continued)

*Primary Examiner* — Augustine K Obisesan
*Assistant Examiner* — Lahcen Ennaji
(74) *Attorney, Agent, or Firm* — Gearhart Law LLC

(57) ABSTRACT

A method for a processing device to determine whether to assign a data item to at least one cluster of data items is disclosed. The processing device may identify a signature of the data item, the signature including a set of elements. The processing device derive a first size value of the number of elements of the identified signature based on a set of size values of signatures that includes a maximum size value representing the largest number of elements in a signature. The processing device may derive a second size value of the number of elements of a second signature that is similar to the identified signature based on the set of size values of signatures. The processing device may select a subset of the set of elements of the identified signature to form at least one partial signature of the identified signature wherein the number of elements in the partial signature represents the number of elements in common between a signature having the first size value and a second similar signature having the second size value. The processing device may combine the selected subset of elements into at least one token. The processing device may determine whether the at least one token is present in a memory, the memory configured to contain an existing set of tokens. The processing device may determine whether to assign the data item to at least one cluster based on whether the at least one token is present in the memory.

27 Claims, 20 Drawing Sheets

(56) References Cited

U.S. PATENT DOCUMENTS

| | | | |
|---|---|---|---|
| 9,116,974 | B2 | 8/2015 | Heit et al. |
| 9,280,593 | B1 | 3/2016 | Dykstra et al. |
| 2014/0297682 | A1* | 10/2014 | Raichelgauz ....... G06F 17/3002 707/769 |
| 2016/0092552 | A1* | 3/2016 | Morfonios ........ G06F 17/30091 707/737 |
| 2016/0188981 | A1* | 6/2016 | Doerring ............ G06K 9/00758 382/190 |

OTHER PUBLICATIONS

Xu D, Tian Y (2015), "A comprehensive survey of clustering algorithms," Annals of Data Science, 2(2):165 193).

Ward JH (1963), "Hierarchical grouping to optimize an objective function," J. Amer. Statistical Assoc. 58(301):236 244.

Wang J, Shen HT, Song J, Ji J (2014), "Hashing for similarity search: A survey," ArXiv 1408.2927 v1:1 29.

Leskovec J, Rajaraman A, Ullman J (2014), "Finding similar items," Mining of Massive Data Sets, 2nd Edition, chapter 3, Cambridge University Press.

Zhang X, Qin J, Wang W, Sun Y, Lu J (2013), "HmSearch: An efficient Hamming distance query processing algorithm," Proc. 25th Int. Conf. Sci. and Stat. Database Management 19:1 12.

Arasu A, Ganti V, Shriraghav K (2006), "Efficient exact set similarity joins," Proc. 32nd Int. Conf. Very Large Databases, 918 929.

Xiao C, Wang W, Lin X, Yu JX, Wang G (2011), "Efficient similarity joins for near duplicate detection," ACM Trans. Database Systems 36(3):15.1 15.41.

Jain AK, Murty MN, Flynn PJ (1999) "Data clustering: A review," ACM Computing Surveys, 31(3):264-323.

Xu & Tian, 2015; Xu R, Wunsch D (2005), "Survey of clustering algorithms," IEEE Trans. Neural Networks, 16 (3):645-678.

Deng D, Li G, Wen H, Feng J (2015), "An efficient partition based method for exact set similarity joins," Proc. VLDB Endowment 9(4):360 371.

Bayardo RJ, Ma Y, Srikant R (2007), "Scaling up All Pairs similarity search," Proc. 16th Int. Conf. World Wide Web, 131 140.

Hennig C, Meila M, Murtagh F, Rocci R, Handbook of Cluster Analysis, Chapter 31, 703 730, CRC Press.

Barbakh W, Fyfe C (2008), "Online clustering algorithms," Int. J. Neural Systems, 18(3):1 10.

Ioffe S (2010), "Improved consistent sampling, weighted Minhash and L1 sketching," Proc. 10th IEEE Int. Conf. Data Mining, 246 255.

Gionis A, Indyk P, Motwani R (1999) "Similarity search in high dimensions via hashing," Proc. 25th Int. Conf. Very Large Data Bases, 518 529.

Yang MS (1993), "A survey of fuzzy clustering," Mathematical and Computer Modelling 18(11):1 16.

Sanchez D, Yen L, Hill MD, Sankaralingam K (2007), "Implementing signatures for transactional memory," Proc. 40th Annual IEEE/ACM Int. Symp. Microarchitecture, 123 133.

* cited by examiner

| | | | |
|---|---|---|---|
| | 10:KURD-PRES-RU-SY-TR | 9:KURD-PRES-RU-SY-TR | |
| | 10:EUR-KURD-PRES-RU-SY | 9:EUR-KURD-PRES-RU-SY | |
| | 10:EUR-KURD-PRES-RU-TR | 9:EUR-KURD-PRES-RU-TR | |
| | 10:EUR-KURD-PRES-SY-TR | 9:EUR-KURD-PRES-SY-TR | |
| | 10:EUR-KURD-RU-SY-TR | 9:EUR-KURD-RU-SY-TR | |
| | 10:EUR-PRES-RU-SY-TR | 9:EUR-PRES-RU-SY-TR | |

| | | |
|---|---|---|
| | 8:PRES-RU-SY-TR | 7:PRES-RU-SY-TR |
| | 8:KURD-PRES-SY-TR | 7:KURD-PRES-SY-TR |
| | 8:KURD-PRES-RU-TR | 7:KURD-PRES-RU-TR |
| | 8:KURD-PRES-RU-SY | 7:KURD-PRES-RU-SY |
| | 8:EUR-RU-SY-TR | 7:EUR-RU-SY-TR |
| | 8:EUR-PRES-SY-TR | 7:EUR-PRES-SY-TR |
| | 8:EUR-PRES-RU-TR | 7:EUR-PRES-RU-TR |
| | 8:EUR-KURD-RU-TR | 7:EUR-KURD-RU-TR |
| | 8:EUR-KURD-SY-TR | 7:EUR-KURD-SY-TR |
| | 8:EUR-PRES-RU-SY | 7:EUR-PRES-RU-SY |
| | 8:EUR-KURD-RU-SY | 7:EUR-KURD-RU-SY |
| | 8:EUR-KURD-PRES-TR | 7:EUR-KURD-PRES-TR |
| | 8:EUR-KURD-PRES-SY | 7:EUR-KURD-PRES-SY |
| | 8:EUR-KURD-PRES-RU | 7:EUR-KURD-PRES-RU |

| | | | |
|---|---|---|---|
| 6:EUR-KURD-TR | 5:EUR-KURD-TR | 4:EUR-KURD-TR | 3:EUR-KURD-TR |
| 6:EUR-KURD-SY | 5:EUR-KURD-SY | 4:EUR-KURD-SY | 3:EUR-KURD-SY |
| 6:EUR-KURD-RU | 5:EUR-KURD-RU | 4:EUR-KURD-RU | 3:EUR-KURD-RU |
| 6:EUR-KURD-PRES | 5:EUR-KURD-PRES | 4:EUR-KURD-PRES | 3:EUR-KURD-PRES |
| 6:RU-SY-TR | 5:RU-SY-TR | 4:RU-SY-TR | 3:RU-SY-TR |
| 6:PRES-SY-TR | 5:PRES-SY-TR | 4:PRES-SY-TR | 3:PRES-SY-TR |
| 6:PRES-RU-TR | 5:PRES-RU-TR | 4:PRES-RU-TR | 3:PRES-RU-TR |
| 6:PRES-RU-SY | 5:PRES-RU-SY | 4:PRES-RU-SY | 3:PRES-RU-SY |
| 6:KURD-PRES-TR | 5:KURD-PRES-TR | 4:KURD-PRES-TR | 3:KURD-PRES-TR |
| 6:KURD-RU-SY | 5:KURD-RU-SY | 4:KURD-RU-SY | 3:KURD-RU-SY |
| 6:KURD-RU-TR | 5:KURD-RU-TR | 4:KURD-RU-TR | 3:KURD-RU-TR |
| 6:KURD-SY-TR | 5:KURD-SY-TR | 4:KURD-SY-TR | 3:KURD-SY-TR |
| 6:KURD-PRES-SY | 5:KURD-PRES-SY | 4:KURD-PRES-SY | 3:KURD-PRES-SY |
| 6:KURD-PRES-RU | 5:KURD-PRES-RU | 4:KURD-PRES-RU | 3:KURD-PRES-RU |
| 6:EUR-SY-TR | 5:EUR-SY-TR | 4:EUR-SY-TR | 3:EUR-SY-TR |
| 6:EUR-RU-TR | 5:EUR-RU-TR | 4:EUR-RU-TR | 3:EUR-RU-TR |
| 6:EUR-RU-SY | 5:EUR-RU-SY | 4:EUR-RU-SY | 3:EUR-RU-SY |
| 6:EUR-PRES-TR | 5:EUR-PRES-TR | 4:EUR-PRES-TR | 3:EUR-PRES-TR |
| 6:EUR-PRES-SY | 5:EUR-PRES-SY | 4:EUR-PRES-SY | 3:EUR-PRES-SY |
| 6:EUR-PRES-RU | 5:EUR-PRES-RU | 4:EUR-PRES-RU | 3:EUR-PRES-RU |

EUR-KURD-PRES-RU-SY-TR

FIGURE 8A

SIMILARITY CLUSTERING IN LINEAR TIME WITH ERROR-FREE RETRIEVAL USING SIGNATURE OVERLAP WITH SIGNATURE SIZE MATCHING

TECHNICAL FIELD

Examples of the present disclosure relate to clustering methods, and more particularly, to a clustering method that clusters items in linear time with error-free retrieval.

BACKGROUND

Clustering is a class of data analysis techniques widely used in the field of computational data science, with application to problems in news search, genomics, epidemiology, web analytics, business, econometrics, demographics, ecological dynamics, seismology, meteorology, astronomy, particle physics, and other domains (see Jain A K (2010), "Data clustering: 50 years beyond K-Means," *Pattern Recog. Lett.* 31(8):651-666). With increasing data capacities and speeds in computing, technologists seek to perform clustering on ever-larger "big data" sets.

Clustering refers to assigning data items into groups ("clusters") based on factors such as data value similarity, data set divisibility, data set density, and application-specific requirements (see Xu D, Tian Y (2015), "A comprehensive survey of clustering algorithms," *Annals of Data Science*, 2(2):165-193). In addition, clustering typically involves retrieval of the assigned groupings—given a data item, output the other data items with which it is grouped.

Similarity clustering entails comparing data items to each other along one or more dimensions, and possibly assigning similar data items to the same group. It is impractical for individuals to perform clustering manually on data sets with more than a few hundred items; beyond that number, computers are de facto required. Clustering has become necessarily rooted in computer technology.

With large data sets, similarity computations can become slow and expensive, as each data item is compared to a large number of other data items. The time complexity of similarity clustering has been viewed as fundamentally $O(n^2)$ (quadratic in the number of data items) in methods where the number of clusters may grow. Other methods (e.g., k-means clustering) cap the number of clusters at a constant, k, which leads to O(nk) time complexity, but at the cost of generally inferior clustering (see Steinbach M, Karypis G, Kumar V (2000), "A comparison of document clustering techniques," *Proc. Workshop Text Mining, 6th ACM SIGKDD Int. Conf. Data Mining*, KDD-2000).

Throughout the computer era, improving the time efficiency of clustering has been a subject of intensive and voluminous research. The earliest computational algorithms for clustering date from the late 1950s and early 1960s (e.g., Ward J H (1963), "Hierarchical grouping to optimize an objective function," *J. Amer. Statistical Assoc.* 58(301):236-244). Many methods for data clustering are currently in use and are well known in the art. To reduce or to work around the high computational cost of clustering, methods have been developed that use partitioning, filtering, probabilistic calculations, hierarchical calculations, parallel processing, and other approaches (see Jain, 2010). Research and development on clustering is active and ongoing (e.g., Deolalikar V, Laffitte H (2015), "Adaptive hierarchical clustering algorithm," U.S. Pat. No. 9,020,271; Dykstra A J, Chakravarthy D, Dai S (2016), "Centroid detection for clustering," U.S. Pat. No. 9,280,593; Heit J, Dey S, Srinivasan S (2015), "System and method for clustering data in input and output spaces," U.S. Pat. No. 9,116,974).

Current similarity clustering methods have the characteristic that the required amount of computational work increases per additional data item. Even with aggressive techniques such as parallelization, measuring similarity between the items in a large data set can require a prohibitive amount of computation. This technical problem limits the quality and applicability of similarity clustering.

It would be ideal to find a similarity clustering method with O(n) (linear in the number of data items) time complexity—i.e., constant time per item, irrespective of the number of items or number of clusters. Such a method would expand the benefits of similarity clustering to much larger data sets.

Despite their utility, current clustering techniques still have been subject to performance tradeoffs. Similarity clustering in linear or near-linear time can be obtained via probabilistic clustering algorithms—but at the cost of admitting errors in retrieval, such as false negatives, in which the algorithm may (with small probability) erroneously omit certain cluster members during cluster retrieval. For probabilistic clustering algorithms, false-positive errors can occur too; false positives can be screened out by a post-clustering check of actual similarity between each item and one or more members of its purported cluster.

Some applications require or prefer an error-free, or exact, clustering method rather than a probabilistic, or approximate, one. If the cost of a false negative or false positive error is high, it may be impossible or infeasible to raise the approximation tolerance threshold of a probabilistic clustering algorithm sufficiently, within the performance requirements of the application.

For example, using a similarity threshold of 0.2, the probabilistic locality sensitive hashing algorithm for Min-Hash signatures (Wang J, Shen H T, Song J, Ji J (2014), "Hashing for similarity search: A survey," *ArXiv* 1408.2927 v1:1-29) would require over 14,000 hash computations per data item to obtain a false-negative error rate of 1%. Reducing the false-negative error rate to 0.00000001% (which admits approximately one false negative in every 100,000,000 data items) would require over 57,000 hash computations per data item (see Leskovec J, Rajaraman A, Ullman J (2014), "Finding similar items," *Mining of Massive Data Sets*, $2^{nd}$ Edition, chapter 3, Cambridge University Press). Probabilistic clustering algorithms provide no guarantee of freedom from retrieval errors.

Previous efforts by a large, global community of skilled data scientists, statisticians, and computer scientists have produced clustering algorithms that have supra-linear time complexity, or are probabilistic rather than error-free, but have failed to yield an O(n) clustering method that is guaranteed to be free of retrieval errors. Indeed, key disclosures at the forefront of research and development on this problem and on related problems teach away from O(n) clustering with error-free retrieval, commonly supposing supra-linear growth in memory usage (see Zhang X, Qin J, Wang W, Sun Y, Lu J (2013), "HmSearch: An efficient Hamming distance query processing algorithm," *Proc. $25^{th}$ Int. Conf Sci. and Stat. Database Management* 19:1-12), potential limitations on scalability (see Arasu A, Ganti V, Shriraghav K (2006), "Efficient exact-set similarity joins," *Proc. $32^{nd}$ Int. Conf Very Large Databases*, 918-929), restrictions on the degree of similarity within a cluster (see Xiao C, Wang W, Lin X, Yu J X, Wang G (2011), "Efficient similarity joins for near duplicate detection," *ACM Trans.*

*Database Systems* 36(3):15.1-15.41), or restrictions on the number of symbol elements in the data universe (see Zhang et al., 2013).

A linear-time clustering method would imply that the time to cluster each data item is upper-bounded by a constant, and hence does not grow with the number of clustered data items. A linear-time clustering method with error-free retrieval would logically appear to be impossible on the surface, as it seemingly could not perform enough similarity comparisons on each data item.

In summary, there have been more than 50 years (see Jain, 2010; Jain A K, Murty M N, Flynn P J (1999) "Data clustering: A review," *ACM Computing Surveys,* 31(3):264-323; Xu & Tian, 2015; Xu R, Wunsch D (2005), "Survey of clustering algorithms," *IEEE Trans. Neural Networks,* 16(3):645-678) of active research and development on clustering methods by experts in many disciplines. A linear-time clustering method with error-free retrieval would be highly desirable and useful. A seeming illogical bias in the art (no growth in comparison time per element) has led researchers to avoid deeply investigating the possibility of linear-time clustering with error-free retrieval.

SUMMARY

The above-described problems are remedied and a technical solution is achieved in the art by providing a clustering method and system for a processing device to determine whether to assign a data item to at least one cluster of data items. The processing device may identify a signature of the data item, the signature including a set of elements. The processing device may select a subset of the set of elements to form at least one partial signature. The processing device may combine the selected subset of elements into at least one token. The processing device may determine whether the at least one token is present in a memory. The memory may be configured to contain an existing set of tokens. The processing device may determine whether to assign the data item to at least one cluster based on whether the at least one token is present in the memory. The processing device may determine whether to assign the data item to at least one cluster based on whether the at least one token is absent from the memory. The processing device may store the at least one token into the memory.

The above-described problems are remedied and a technical solution is achieved in the art by providing a clustering method and system for a processing device to determine whether to assign a data item to at least one cluster of data items. The processing device may identify a signature of the data item, the signature including a set of elements. The processing device may derive a first size value of the identified signature corresponding to the number of elements in the identified signature. The processing device may select at least one partial signature of the identified signature. The number of elements in the partial signature is the number of elements in common between a signature having the first size value and a second similar signature having a number of elements that is an second size value from a pre-specified list of allowable size values. The processing device may combine the selected subset of elements into at least one token. The processing device may determine whether the at least one token is present in a memory, the memory configured to contain an existing set of tokens. The processing device may determine whether to assign the data item to at least one cluster based on whether the at least one token is present in the memory. The processing device may further determine whether to assign the data item to at least one cluster based on whether the at least one token is absent from the memory. The processing device may store the at least one token into the memory.

The above-described problems are remedied and a technical solution is achieved in the art by providing a clustering method and system for a processing device to assign a data item to at least one cluster of data items. The processing device may derive a first size value of the number of elements of the identified signature based on a set of size values of signatures that includes a maximum size value representing the largest number of elements in a signature. The processing device may derive a set of second size values of the number of elements of a second signature that is similar to the identified signature based on the set of size values of signatures. The processing device may generate a plurality of partial signatures from one or more combinations of elements of the identified signature. For each partial signature of the plurality of partial signatures, the processing device may combine the elements of the partial signature into one or more tokens. The processing device may use the first size value or a size value from the set of second size values to reduce a set of possible matches of the one or more tokens in a table in a memory. The processing device may determine which of the one or more tokens is marked as a key of a key-value pair in the table in the memory in view of the reduced set of possible matches. The processing device may assign the data item to at least one cluster based on the one or more tokens that are marked or a remainder of the tokens that are not marked.

The above-described problems are remedied and a technical solution is achieved in the art by providing a method and system for a processing device to group data items of a list of data items. The processing device may identify a signature of a data item, the signature including a set of elements. The processing device may select a subset of the elements of the identified signature to form one or more partial signatures. The processing device may combine the selected subset of elements to form one or more tokens. The processing device may determine whether the one or more tokens is marked with one or more markers in a memory, the memory configured to contain an existing set of markers for tokens. The processing device may assign the data item to at least one group when one or more tokens is marked with the one or more markers is in the memory.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which:

FIG. 8A shows the MO tokens that MIMOSA may generate for one identified signature using the MIMO table in FIG. 7B.

Figure 1A:
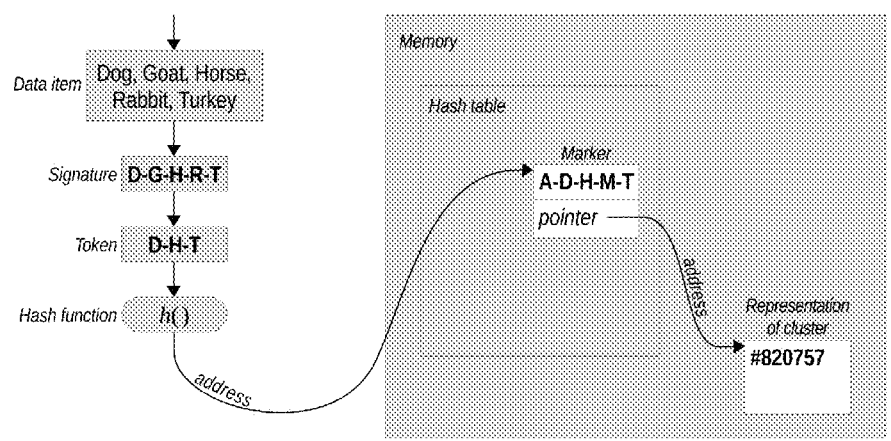
FIG. 1A illustrates one example of how a token derived from a signature of a data item may be used to determine whether a similar data item is present in a data set.

It is to be understood that the attached drawings are for purposes of illustrating the concepts of the invention and may not be to scale.

DETAILED DESCRIPTION

Examples of the present disclosure provide a clustering method that may check the similarity of each data item to all other received data items within a fixed, constant number of steps. The method is called the Mark-In, Match-Out Similarity Algorithm (MIMOSA). MIMOSA may be directed to perform similarity clustering in linear time with error-free retrieval. Because the time to check a data item does not grow with the number of data items, MIMOSA may perform clustering with linear time complexity—faster than other methods when the number of data items is large.

MIMOSA is a signature-based clustering method. In signature-based clustering methods, each data item may come with a signature, defined herein as a limited-size set of elements, or key terms, that characterize or describe the data item, so that the signatures of similar data items may have one or more elements in common.

For example, in an application where each data item is a news story, the identified signature for a story can be a set of up to 12 keywords or key phrases that together denote the most important people, companies, and events in the story. Stories that share several keywords or key phrases—i.e., cover the same topic—can belong to the same cluster. Techniques such as stemming are commonly used to assign variant forms (e.g., act, acts, acted, acting, actor, actors, action, actions, actionable, actionably) of the same root word (act) to the same signature element. For an example news story of 700 words, entitled "School, infrastructure bond measures fill U.S. ballots", the identified signature might be represented as "BALLOT-BOND-BORROW-CALIFORNIA-INFRASTRUCTURE-MEASURE-MU-NICIPAL-SCHOOL-TAX-TRANSIT-VOTE-YIELD".

Each element in the identified signature may represent a term or terms chosen from the news story for high informational value. Terms of lower value, such as common stopwords ("the") or words appearing infrequently in the story ("airport") may typically be omitted from a news story signature. The elements of an identified signature may be arranged in a sorted order.

Another common method for generating a signature is the MinHash algorithm (Wang et al., 2014). The data item is split into pieces, a hash function is applied to each piece, and a set of the smallest resulting hashed values is identified. That set constitutes the elements of a signature for the data item. Similar data items are likely to have signature elements in common.

With MIMOSA, any type of signature derived from the data items may be used. MIMOSA is not concerned with the way in which the data item signatures are generated. MIMOSA operates on the identified signatures to find data items whose signatures are similar and to cluster the data items accordingly.

Similarity is defined formally by reference to a similarity measure. In an example, the degree of pairwise similarity between data item signatures X and Y may be measured using a similarity measure $s(X,Y)$, where greater similarity is indicated by higher value, up to a maximum of $s(X, X)=1$. Equivalently, the pairwise dissimilarity of data item signatures can be measured using a distance measure $d(X,Y)$, with $d(X,X)=0$. When $s(X,Y)$ meets or exceeds a minimum threshold value $\theta$, then X and Y are said to be similar to each other with respect to $s(\ )$ and $\theta$. If $s(\ )$ and $\theta$ are clear from context, then X and Y may be said to be similar.

A particularly useful class of similarity measures is the "overlap similarity" measures (see Deng D, Li G, Wen H, Feng J (2015), "An efficient partition based method for exact set similarity joins," *Proc. VLDB Endowment* 9(4):360-371), which arithmetically combine set intersection, union, and size operations. The overlap similarity measures include

| | |
|---|---|
| Jaccard similarity: | $s(X,Y) = \|X \cap Y\|/\|X \cup Y\|$ |
| Cosine similarity: | $s(X,Y) = \|X \cap Y\|/\sqrt{\|X\|\cdot\|Y\|}$ |
| Sørensen-Dice similarity: | $s(X,Y) = \|X \cap Y\|/\frac{1}{2}(\|X\| + \|Y\|)$ |
| Tanimoto similarity: | $s(X,Y) = \|X \cap Y\|/(\|X\| + \|Y\|)$ |
| Tversky similarity: | $s(X,Y) = \|X \cap Y\|/(\|X \cap Y\| + \alpha\|X-Y\| + \beta\|X-Y\|)$ |
| Szymkiewicz-Simpson similarity: | $s(X,Y) = \|X \cap Y\|/\min(\|X\|,\|Y\|)$ |
| Mutual similarity: | $s(X,Y) = \|X \cap Y\|/\max(\|X\|,\|Y\|)$ |

These offer the benefit that the similarity of two sets depends on the members of the sets themselves, not on characteristics of or assumptions about a wider universe. Moreover, there is no requirement that the sets have a particular size relationship, nor that the members appear in any order. Thus, the overlap similarity measures are considered to measure set similarity rather than string similarity.

FIG. 1A illustrates steps of operation of an instantiation of MIMOSA. A data item belonging to an input set of data items is received. In an example, each data item may represent the types of animals on a farm. Farm 1 has alpacas, dogs, horses, minks, and turkeys. Farm 2 has dogs, goats, horses, rabbits, and turkeys. Are the two farms similar to each other, in terms of their animal types?

An intermediate state during MIMOSA operation is depicted in FIG. 1A. FIG. 1A shows the state after the data item for Farm 1 is processed, and before the data item for Farm 2 is processed.

In processing Farm 1, MIMOSA stores several marker values into a hash table. A marker value for Farm 1 may represent various aspects of the Farm 1 data item, or a cluster to which Farm 1 is assigned. One such marker value is illustrated, representing a signature (A-D-H-M-T) of the Farm 1 data item and a pointer to additional information about the cluster to which the Farm 1 data item is assigned. The additional information may be stored in another section of memory, not necessarily in the hash table. In FIG. 1A, the additional information contains an identifier value (#820757) for the cluster to which the Farm 1 data item is assigned. In an example, additional information representing the cluster may also contain one or more reverse pointers (not shown) to the markers for data items assigned to the cluster.

One aspect of MIMOSA is the hash key that MIMOSA uses to store each marker value into the hash table, and to retrieve stored values from the table. MIMOSA may apply a hash function h( ) to each hash key, forming an address for each stored value. A value stored into the hash table via a given hash key may later be retrieved using the same hash key. The hash keys that MIMOSA uses for this purpose are called tokens. MIMOSA may create the tokens in such a way that two data items are similar to each other if and only if they have at least one token in common. When MIMOSA processes a data item, it uses this property to find similar data items. If MIMOSA finds a similar data item, it may assign the data item to the same cluster as the similar data item.

MIMOSA obtains a signature from each data item, and then derives one or more tokens from the signature. A signature comprises one or more elements. In an example, MIMOSA may form each token from a partial signature of the signature. A partial signature is a set of one or more of the elements of the signature. MIMOSA may omit partial signatures that would not indicate similarity of the signature to another signature. FIG. 1A shows a signature D-G-H-R-T, comprising elements D, G, H, R, and T. It shows one token, D-H-T, formed from a set of those elements.

When MIMOSA processes the Farm 1 data item, it generates several tokens, and uses those tokens as hash keys to store several marker values into the hash table. One of those tokens is D-H-T, comprising elements of the Farm 1 data item signature, A-D-H-M-T.

When MIMOSA processes the Farm 2 data item, it again generates several tokens, and it checks whether any of those tokens was used as a hash key to store a marker value into the hash table. One of those tokens, again, is D-H-T. FIG. 1A shows that MIMOSA finds an existing marker in the hash table, addressed by hash key D-H-T.

Because MIMOSA finds an existing marker for D-H-T, MIMOSA may determine that the Farm 2 data item can be assigned to an existing cluster. MIMOSA may then use the marker value stored in the hash table via hash key D-H-T to identify which cluster that is. For example, MIMOSA may follow a pointer from the marker to a representation in memory of the cluster, containing a cluster ID value, #820757. Because the signatures for Farm 1 and Farm 2 have a token in common, MIMOSA may determine that Farm 1 and Farm 2 are indeed similar.

After determining whether the tokens derived from the Farm 2 data item signature are marked in the hash table, MIMOSA may assign the Farm 2 data item to a cluster by storing more marker values into the hash table, via hash keys comprising the tokens derived from the Farm 2 data item signature. At that point, MIMOSA is ready to process another data item, Farm 3, which MIMOSA would check for similarity to the data items for Farm 1 and Farm 2.

Even though more and more marker values are stored into the hash table, the amount of time that MIMOSA takes to check each data item and assign it to a cluster does not grow. The reason for this important characteristic is that the number of tokens per data item depends on the data item itself, but not on the number of data items. As a result, MIMOSA takes about the same amount of time to process the one-millionth data item that it takes to process the first. MIMOSA's running time is thus linear in the number of input data items—a property which allows MIMOSA to run faster than other methods when the number of data items is large.

MIMOSA may be preconfigured by specifying a similarity measure, a minimum similarity threshold value at or above which two data item signatures may be considered to belong to a cluster, and a list of the size values (number of elements) that are allowed or expected for signatures.

MIMOSA may operate during a "Mark-In" stage by marking a set of tokens from each data item in a hash table, or other key-value memory storage that allows insertion and retrieval in constant time. As used herein, a Mark-In stage refers to a series of processing steps in which MIMOSA stores one or more tokens into memory. This stage ensures that when a search for similar items takes place, the one or more tokens are already where they are needed, to determine cluster membership within a fixed amount of time.

As used herein. "storing a token" may refer to storing the data that represents the token or using the token as a key to store a marker. As used herein, a "marker" is a value that is stored in memory via a token and retrieved from memory via the token. As used herein, a token is a value, such as a string, that may be stored as a unit. A token may be used to find a marker in memory—for example by computing the marker's memory address as a function of the token, or by following a chain of one or more pointers identified by the token to the marker in memory. The memory may be configured as a key-value data structure, such as a hash table, or a content-addressable memory, in which the token is used as a key to store and retrieve its corresponding marker value. A token may address one marker, which is termed the marker for the token. The marker may be termed the associated value for the token. When a marker is stored for a token, the token is said to be marked. Marking refers to storing a marker for a token. Depending on implementation, the value of a marker may represent a simple flag to indicate just that the token is marked; or it may represent one or more other pieces of information pertaining to a data item or to a cluster, such as a signature, a cluster identifier, the token, or a pointer to additional information.

The number of tokens for each data item does not exceed a fixed maximum. Accordingly, the number of token marking operations performed for each data item is capped at a fixed maximum. The tokens in MIMOSA may represent a set of combinations of the elements of the identified signature of the data item such that the identified signature of any similar (with respect to the minimum similarity threshold value and the measure of similarity) data item would share at least one of the same tokens. Two signatures may share a token if and only if they are similar. MIMOSA employs this property to check the similarity of each data item to other data items within a fixed number of steps.

MIMOSA may mark each of the tokens in its hash table as hash keys that can be checked when another data item is added into the data set. These tokens conceptually represent points in a multi-dimensional neighborhood surrounding the identified signature. A marker value associated with a token may also be placed into the hash table as a hash value, in a key-value pair using the token as the hash key. The marker value may identify the cluster to which the data item is assigned. MIMOSA may also place a link from a marker for a token inward to a representation of the data item signature from which the token was derived.

For each data item added to the data set, MIMOSA may check a set of hash keys, of fixed maximum number, during a "Match-Out" stage. As used herein, a Match-Out stage refers to a series of processing steps in which MIMOSA checks whether one or more tokens are present in memory or absent from memory.

As used herein, determining whether a token is "present" may refer to determining whether the data that represents the token is present or determining whether the token is used as a key to store a marker. As used herein, determining whether a token is "absent" may refer to determining whether the data that represents the token is absent or determining whether the token is not used as a key to store a marker.

Checking the tokens for a data item conceptually represents looking outward from the data item's identified signature to determine whether a surrounding multi-dimensional neighborhood overlaps with the marked neighborhoods surrounding other data item signatures.

Unlike other clustering methods, MIMOSA does not spend time checking for similarity to signatures that have no possibility of being similar. Rather than checking similarity to all signatures, MIMOSA checks similarity to signatures within a neighborhood around the identified signature. This efficiency is the source of MIMOSA's linear time performance, in contrast to the quadratic performance of other methods.

In an example implementation, MIMOSA may determine whether a token is present or absent by checking whether the memory contains the token. In another example implementation, MIMOSA may determine whether a token is present or absent by checking whether the hash table in memory contains a marker stored for the token.

Conditions and rules for determining how data items are assigned to clusters may be encapsulated separately from MIMOSA, in a pre-specified membership function, interacting with an implementation of MIMOSA. The rules of a membership function affect the clustering outcome: which data items are assigned to which cluster. The membership function may be chosen according to the needs of the application domain in which MIMOSA is applied. Various membership functions might permit a data item to be added to a cluster on the basis of certain conditions, such as (examples without limitation) similarity to: a centroid of the cluster; at least one data item in the cluster; at least three (or all if there are fewer than three) data items in the cluster; or all of the data items in the cluster. In addition, membership functions may optionally include conditions and rules for certain side effects, such as merging or splitting clusters.

For each data item, MIMOSA may form a list of tokens that are present and a list of those absent. MIMOSA may invoke the pre-specified membership function, providing the list of tokens that are present, with their corresponding marker values. Depending on the membership function, MIMOSA may also provide one or both of the identified signature or the list of tokens that are absent. In response, the membership function may return to MIMOSA an identifier of a cluster to which the data item is assigned. MIMOSA may then store the assigned cluster identifier for the data item.

If the list of tokens from the data item that are present is empty, the data item is not similar to the other received data items, and the membership function may determine that it does not belong to any existing similarity cluster, the membership function may generate and return a new identifier. If the list of tokens from the data item that are present is not empty, the data item is similar to another data item; the membership function may return an existing identifier from a marker in the list. MIMOSA may then assign the data item to the cluster identified by the returned identifier.

The way that MIMOSA finds the cluster can be described conceptually as a two-step process: traversing "outward" from the identified signature to the token, and then traversing "inward" from a matching token to an identifier of the cluster.

If the membership function finds more than one cluster identifier in the markers from the list of tokens that are present, the membership function may assign the data item to one of the found cluster identifiers, on the basis of pre-specified criteria, such as the earliest-created of the found clusters. Optionally, on the basis of its pre-specified conditions, the membership function may take additional steps, such as merging or splitting clusters, or re-determining the cluster assignments of other data items.

As an illustrative example, consider the sequence shown in Table 1 of 5-element signatures from arriving data items, using mutual similarity, and a minimum similarity threshold of 0.6.

TABLE 1

| | |
|---|---|
| A-B-C-D-E | No prior data has been received; this data item establishes a new cluster. |
| A-B-C-D-F | Similarity 0.8; this data item joins the cluster with A-B-C-D-E. |
| A-B-G-H-I | Similarity 0.4; this data item establishes a new cluster. |
| A-B-G-H-J | Similarity 0.8, this data item joins the cluster with A-B-G-H-I. |
| A-B-C-G-H | Similarity 0.6 to one cluster, and 0.8 to the other, so this joins cluster with A-B-G-H-I. |

TABLE 1-continued

Optionally, because the similarity threshold
is met with respect to two clusters, this data
item may trigger a merge of the two clusters.

Previously developed clustering methods require an increasing number of checks per added data item as the total number of items increases. In contrast, MIMOSA may require at most a fixed number of checks per added data item, capped at a maximum, regardless of the number of data items in the data set. As a result, MIMOSA may require fewer operating steps. compared to the previous methods, when the number of data items is large.

Figure 1B:
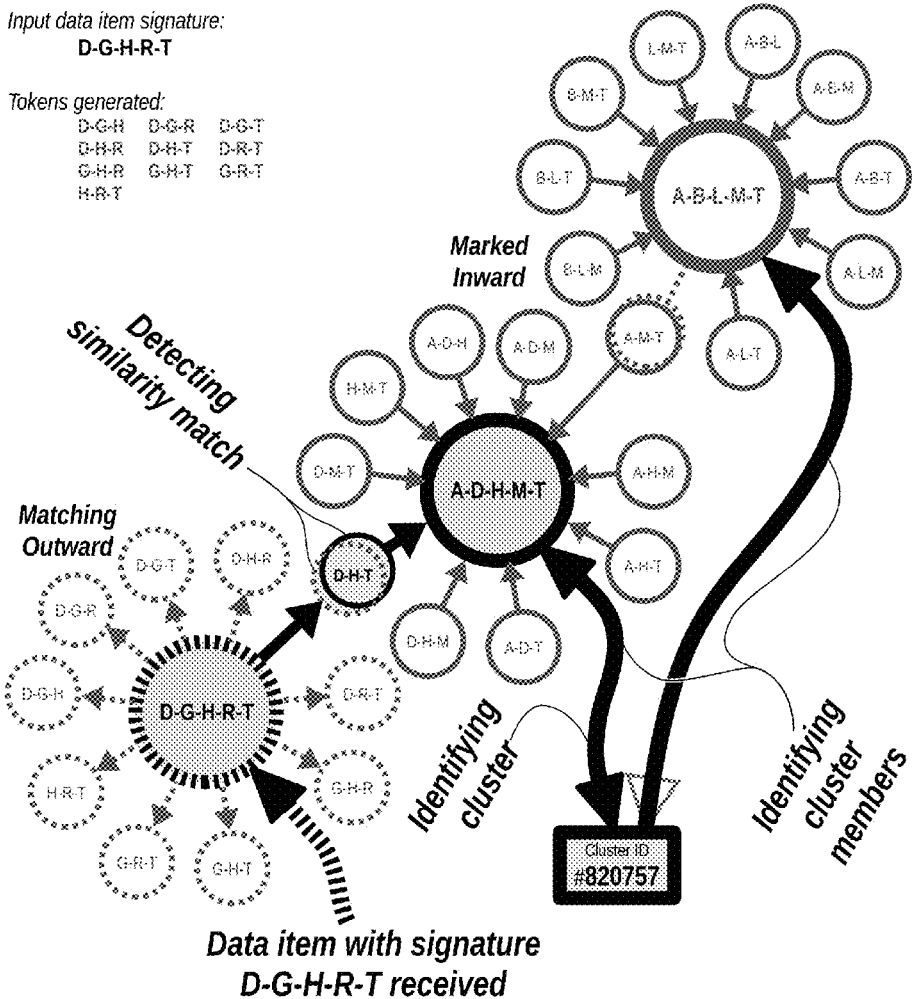
FIG. 1B illustrates one example of the Mark-In, Match-Out Similarity Algorithm (MIMOSA) clustering method when the identified signature (D-G-H-R-T) of a received data item partly matches another signature (A-D-H-M-T).

FIG. 1B illustrates one example of the MIMOSA clustering method when an arriving signature (D-G-H-R-T) partly matches another signature (A-D-H-M-T). In this example, signatures are assumed to be 5 elements long; a Jaccard similarity measure is used, and the matching threshold value θ is assumed to be 0.4. Therefore, two signatures need to have at least 3 of their 5 elements each in common (Jaccard similarity of 3/5) to be judged similar.

In FIG. 1B, MIMOSA has previously assigned two data items, one with signature A-D-H-M-T and one with signature A-B-L-M-T, as members of cluster #820757. FIG. 1B depicts the three-element partial signatures that MIMOSA has formed into one or more tokens and marked in the hash table; there are $$\binom{5}{3} = 10$$

three-element partial signatures for each of the signatures. MIMOSA employs each token as a hash key, stored as a key→value pair with a corresponding marker value that represents the identified signature. MIMOSA has added a link into memory from the representation of the identified signature to a representation of the cluster ID. MIMOSA has also added reverse links into memory, from the representation of the cluster ID to representations of the cluster members.

When a data item with signature D-G-H-R-T arrives, MIMOSA checks whether any of the tokens formed from each of its three-element partial signatures would match an existing token marked in the hash table. The 10 tokens that MIMOSA generates for input signature D-G-H-R-T are listed in FIG. 1B. In this case, the token from one of the partial signatures, D-H-T, is already marked as an existing hash key in the hash table. Thus it is determined that D-G-H-R-T may be added to an existing cluster. If no such existing token were found in the hash table, then it would be determined that D-G-H-R-T can start a new cluster.

MIMOSA identifies the existing cluster to which D-G-H-R-T should be added by following the references inward, from the hash key D-H-T to the corresponding hash value marker for A-D-H-M-T, and then to cluster ID #820757.

MIMOSA may add the identified signature by marking its tokens as hash keys in the hash table, storing all with a corresponding hash value marker that represents the identified signature D-G-H-R-T, and setting the signature data structure to point to the representation of the existing cluster ID #820757.

Optionally, MIMOSA may also place a reverse link into memory from the representation of the cluster ID to the representation of the identified signature. Such a reverse link would be helpful if it is desired to retrieve the members of a cluster, given the cluster ID.

When a data item is added, MIMOSA may compute a set of partial signatures, derived from the identified signature associated with the data item. The set has a fixed maximum number of partial signatures, which depends on the number of elements in the identified signature, the specified minimum similarity threshold value, and the list of allowable sizes of signatures. MIMOSA may combine the elements of each partial signature into a token.

During the Match-Out stage, MIMOSA may use the tokens thus derived from the identified signature as hash keys in a hash table in a memory, to check whether any of them was marked during the addition of any other added data items. If so, a cluster ID may be retrieved from the marker value, and the data item may be judged as belonging to the same cluster as the corresponding data item. If not, the data item may be judged as belonging to a different cluster from all of the other received data items.

During the Mark-In stage for a data item being added, MIMOSA may mark a neighborhood around the identified signature by marking the one or more tokens in memory. Because MIMOSA creates at most a fixed, maximum number of tokens per data item, the number of marking steps that MIMOSA needs to perform per data item is capped at a fixed maximum.

During the Match-Out stage for a data item being added, the number of tokens that MIMOSA needs to check in the hash table per added data item is likewise capped at a fixed maximum.

Because the number of steps that MIMOSA performs on each data item is capped at a fixed maximum, the number of steps does not grow beyond that maximum, even when the number of data items is large. In other words, the amount of computational work performed by MIMOSA per data item is upper-bounded by a constant; and hence, MIMOSA runs in O(n) time (linear time) in the number of data items. The application of these linear-time marking and checking steps to the task of similarity clustering significantly speeds that task, in comparison to other methods, when the number of data items is large. Unlike prior work, MIMOSA uses tokens that combine the elements of the signature themselves, and which are hashed directly rather than being represented as members of a bit vector.

When the signature elements in each token are arranged in a sorted order, the number of tokens needed is much smaller than when unsorted. In the unsorted case, MIMOSA would have to generate and check not just A-B-C, but also permutations A-C-B, B-A-C, B-C-A, C-A-B, and C-B-A, for example. In either case, whether sorted or unsorted, there is a fixed maximum number of tokens per data item, assuming a fixed maximum number of elements in each signature. Hence, MIMOSA runs in linear time in the number of data items, either way. But because of the smaller number of tokens, MIMOSA is faster and uses less memory, by a multiplicative factor, when the elements of each token are sorted.

MIMOSA separates the cluster membership computation from the elementary calculation of similarity, to allow a choice of cluster membership-determining functions to suit the characteristics of the application domain, while preserving the framework of token marking and constant-time-per-item similarity calculation.

MIMOSA may combine these ideas, directed toward improving the existing technological process of data clustering, and their realization using a combination of existing structures and techniques in computing. By providing linear-time performance, MIMOSA permits similarity clustering with error-free retrieval to be executed on computers at scales qualitatively larger and speeds qualitatively faster than other methods.

These concepts—marking a combinatorial set of tokens in a hash table and using them in search for a similarity-based cluster—are unique to computing. And because the issue of linear-time performance arises only in the context of clustering at such a large scale that computers are for all purposes needed, these concepts are applied to solve a problem unique to computational data science.

Practitioners of ordinary skill in the art will recognize that a range of variations, modifications, and alterations of MIMOSA can be implemented, using the basic framework of capped combinatorial token marking and checking, and hence fall within the spirit and scope of MIMOSA.

The MIMOSA method is linear in the number of data items (i.e., upper-bounded by a constant time per data item). If each signature has a maximum size (a maximum number of elements) n, then $2^n-1$ is the maximum number of partial signatures that can be generated from that signature. Since n has a maximum value, $2^n-1$ also has a maximum value. Accordingly, there is a maximum number of partial signatures that can be generated from that signature. Creating a token (by concatenating elements and a size value) can be done in a fixed amount of time per partial signature.

Hash tables have the property that looking up a key and retrieving the corresponding value can be done within a fixed, constant amount of time. This is also true for storing a value into the hash table. Since there are at most a fixed number of tokens per signature, and each token can be looked up and/or stored within a constant amount of time, the total amount of processing time per signature is upper-bounded by a constant amount. Accordingly, under these assumptions, the running time of MIMOSA may grow linearly in the number of data items.

The MIMOSA method may be made even faster—for example, MIMOSA does not necessarily need to generate all of the possible tokens. MIMOSA may just need to generate tokens of certain sizes. With certain enhancements, MIMOSA is still linear, but the processing time per data item is faster.

Figure 1C:
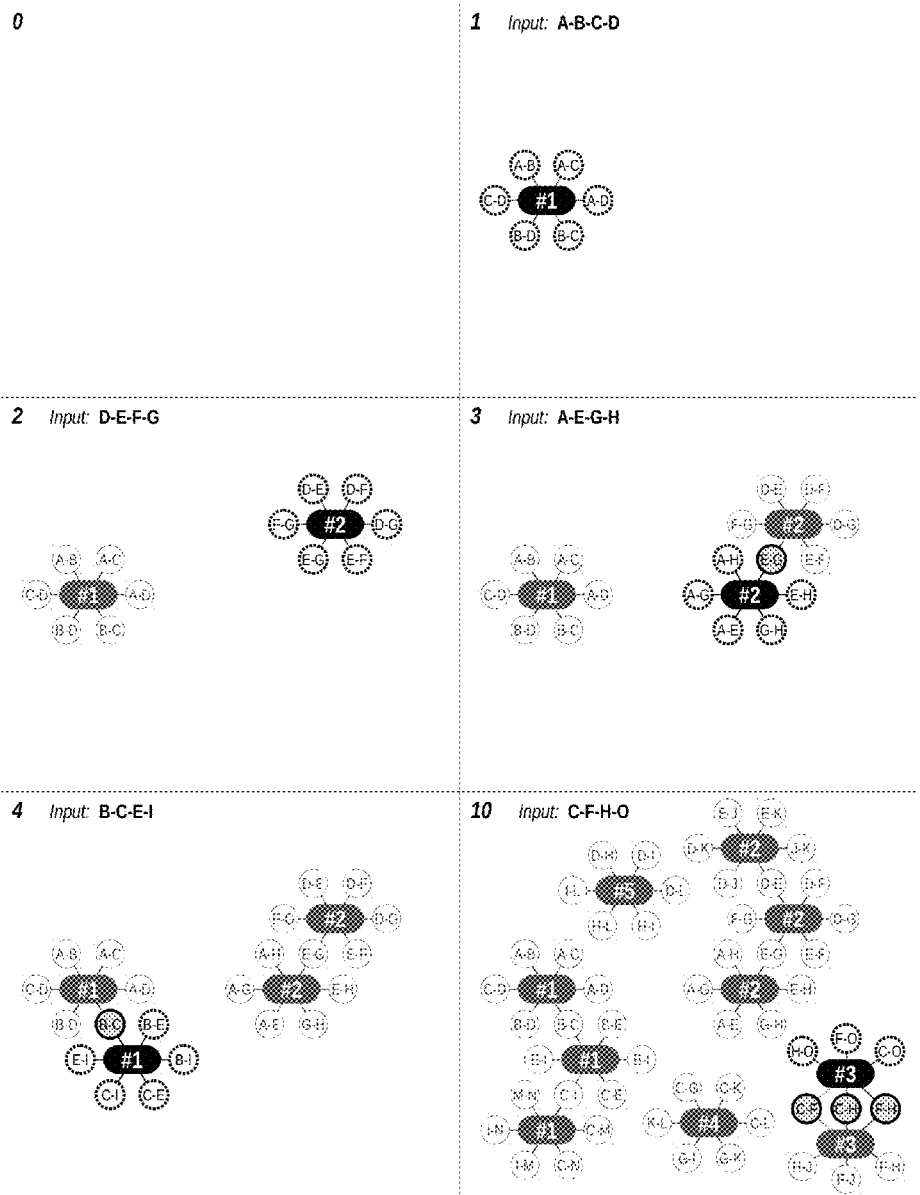
FIG. 1C depicts an example sequence of data item signatures processed by MIMOSA.

FIG. 1C depicts an example sequence of data item signatures processed by MIMOSA. The signatures have 4 elements. The tokens comprise all 2-element combinations of the elements of each signature. In the example, two signatures are considered to be similar if they have at least 2 elements in common.

Each panel of the figure describes the state of memory on receiving an input data item signature. The sequence of signatures received is: A-B-C-D, D-E-F-G, A-E-G-H, B-C-E-I, C-F-H-J, D-E-J-K, C-G-K-L, D-H-I-L, C-I-M-N, C-F-H-O. For each input, MIMOSA marks several tokens in the memory. The memory area begins empty (0).

After the first data item is received (1), MIMOSA generates tokens comprising all 2-element combinations of the signature, A-B-C-D. MIMOSA finds none of the tokens already marked in the hash table, so it stores markers for each of them (A-B, A-C, A-D, B-C, B-D, C-D) into the hash table, linking to a representation of a new cluster, with identifier #1. FIG. 1C shows the 2-element tokens marked in the hash table, as well as links to the identifier of the cluster to which the signature is assigned.

After the second data item, with signature D-E-F-G, is received (2), MIMOSA generates tokens comprising all 2-element combinations (D-E, D-F, D-G, E-F, E-G, F-G) of its signature. MIMOSA checks whether they are marked in the hash table, and finds none, so it marks them in the hash table, linking to a representation of a new cluster, with identifier #2.

After the third data item is received (3), MIMOSA generates tokens comprising all 2-element combinations (A-E, A-G, A-H, E-G, E-H, G-H) of its signature. MIMOSA checks whether they are marked in the hash table. MIMOSA finds that one of those tokens, E-G, is already present, so it marks the tokens in the hash table, using links to the representation of the existing cluster with identifier #2.

After the fourth data item is received (4), MIMOSA generates tokens comprising all 2-element combinations (B-C, B-E, B-I, C-E, C-I, E-I) of its signature. MIMOSA checks whether they are marked in the hash table. MIMOSA finds that one of those tokens, B-C, is already marked, so it marks the tokens in the hash table, using links to the representation of the existing cluster with identifier #1.

As additional data items are received, MIMOSA generates the tokens corresponding to each signature, and checks whether the tokens are marked in the hash table. When none is found, MIMOSA marks the tokens in the hash table using links to a representation of a cluster with a new identifier. When a token is found, MIMOSA marks the tokens in the hash table using links to the representation of the corresponding cluster, with an existing identifier.

After the tenth data item is received (10), MIMOSA generates tokens comprising all 2-element combinations (C-F, C-H, C-O, F-H, F-O, H-I) of its signature. MIMOSA checks whether they are marked in the hash table. MIMOSA finds that three of those tokens, C-F, C-H, and C-O, are already marked for an existing cluster, so MIMOSA marks the tokens in the hash table, using links to the representation of the existing cluster with identifier #3.

Figure 2:
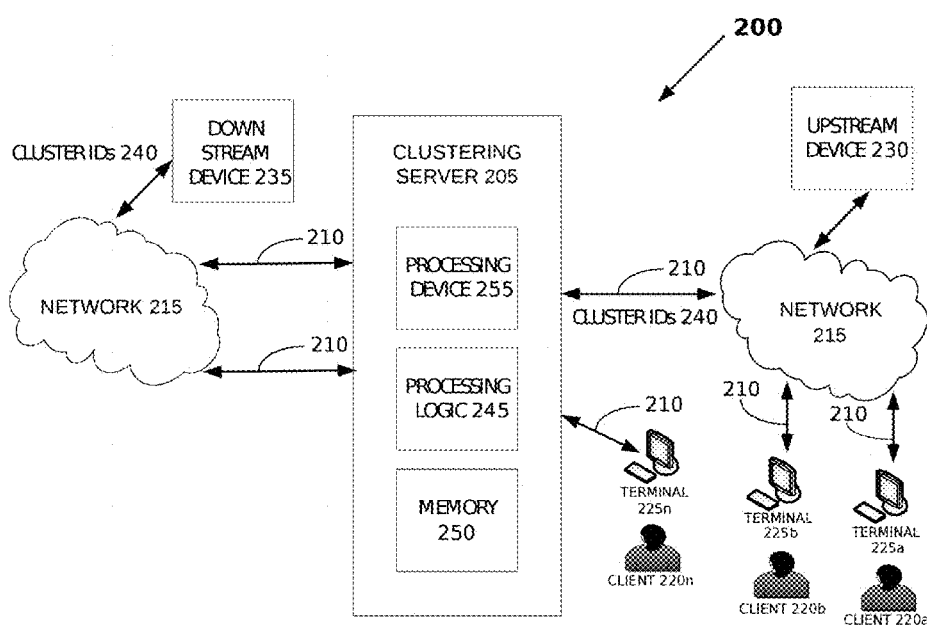
FIG. 2 is a block diagram of an example system in which examples of the present disclosure may operate.

FIG. 2 is a block diagram of an example system 200 in which examples of the present disclosure may operate. A clustering server 205 may be configured to receive one or more data items 210, for example, over a network 215, which may be, but is not limited to, the Internet. The one or more data items 210 may be, for example, one of a news story, a genomic sequence, an epidemiological record, a webserver log entry, a webpage view record, a customer sales transaction record, an economic measurement, a marketing survey response, an industrial machine sensor reading, a manufacturing test record, a census entry, an ecological observation, a seismic time-series measurement, a meteorological measurement, an astronomical observation, or a physics apparatus output record. The one or more data items 210 may be received from one or more clients 220a-220n entering input at a terminal (e.g., 225a) e.g., over the network 215, directly from a terminal 225n communicatively connected to the clustering server 205, or from an upstream device 230. As used herein, a client (e.g., 220a) may be, for example a human user, operator, or customer of the system 200, or may be a non-terminal automated client application (e.g., 220b) as part of a client server relationship communicatively connected to the network 215 or to the clustering server 205 using an application programming interface (API).

The one or more data items 210 may be received by the clustering server 205 online one data item at a time. The data items 210 may be presented in chronological order of arrival time. The one or more data items 210 may be received by the clustering server 205 in batch mode (e.g., a file of data items), the data items within a batch being presented sequentially in any order, regardless of how the order is determined.

In another example, the clustering server 205 may initiate pushing to the client (e.g., 220a) or to a downstream device 235 one or more cluster identifiers 240 to which the data items 210 belong placed by the clustering server 205 in one or more clusters and identified by the one or more corresponding cluster identifiers 240. In an example, the clustering server 205 initiating pushing to the client (e.g., 220a) the set of cluster identifiers 240 may be a scheduled event or triggered event. In another example, the one or more clients 220a-220n may receive on the terminal (e.g., 225a) e.g., over the network 215, the set of cluster identifiers 240. In another example, the one or more clients 220a-220n may receive on the terminal (e.g., 225a) e.g., over the network 215, the set of cluster identifiers 240 for a time interval, e.g., collected over the course of a day. The clustering server 205 may additionally transmit to the client (e.g., 220a) a graphical representation of corresponding clustered data items to be displayed on the terminal (e.g., 225a) associated with the client (e.g., 220a).

The clustering server 205 may be configured to receive a data item 210 from the client (e.g., 220a). Processing logic 245 in the clustering server 205 may be configured to identify a signature of the data item 210, the signature including a set of elements. The processing logic 245 may be configured to select a subset of the elements of the identified signature to form at least one partial signature. The processing logic 245 may be configured to combine the selected subset of elements into at least one token. The processing logic 245 may be configured to determine whether the at least one token is present in a memory 250, the memory 250 configured to contain an existing set of tokens.

As used herein, a memory "configured to contain an existing set of tokens" may refer to a memory configured to contain the data that represents an existing set of tokens or a memory configured to contain one or more markers each of which may be stored or retrieved using a key from an existing set of tokens.

The processing logic 245 may be configured to determine whether to assign the data item to at least one cluster based on whether the at least one token is present in the memory 250 or is absent from the memory 250.

The memory 250 may be organized as a constant-time key-value memory 250. The constant-time key-value memory 250 may be one of a hash table, a map, a symbol table, an associative array, or an unordered dictionary data structure.

The processing logic 245 may assign the data item to a new cluster when the one or more values in the memory 250 do not match any token in the memory. The processing logic 245 may assign the data item to an existing cluster when the one or more values in the memory matches one or more tokens in the memory 250. The processing logic 245 may merge two or more clusters into a merged cluster when the one or more values in the memory 250 matches two or more tokens in the memory 250. The processing logic 245 may split a cluster into two or more clusters.

The processing logic 245 may store as one or more keys the one or more tokens of the identified signature into the memory 250. The processing logic 245 may output an identifier of the at least one cluster to which the data item is assigned.

The processing logic 245 may be configured to concatenate the selected elements with a separator to form a string that comprises the token. Combining the elements of the at least one partial signature may be based on a sorted representation of the said elements.

The processing logic 245 determining whether to assign the data item 210 to at least one cluster may further include the processing logic 245 determining whether to merge two or more clusters into one cluster based on whether the at least one token matches two or more tokens present in the memory, the two or more tokens being stored in the memory with two or more associated values identifying the two or more clusters. The processing logic 245 determining whether to assign the data item 210 to at least one cluster may further include the processing logic 245 determining whether to split a cluster into two or more clusters. The processing logic 245 determining whether to assign the data item 210 to at least one cluster may be based on factors including at least one of the number of data items assigned to a cluster, a minimum similarity between the signatures of two data items in a cluster, a minimum similarity between the identified signature and a centroid of a cluster, a density of a cluster, the number of tokens in common between signatures, or the number of elements in the tokens in common between signatures. The processing logic 245 determining whether to assign the data item 210 to at least one cluster may further depend on determining whether the identified signature is similar to a signature from which the at least one token present in the memory is formed.

The processing logic 245 selecting a subset of the set of elements of the identified signature to form at least one partial signature may be based on a similarity measure of the identified signature to a second signature and on a minimum similarity threshold value. The similarity measure may be at least one of Jaccard similarity, Levenshtein similarity, a Szymkiewicz-Simpson overlap coefficient, mutual similarity, a Sørensen-Dice coefficient, or a Tversky similarity index.

The processing logic 245 may repeatedly perform said selecting, said combining, said determining whether the at least one token is present in a memory, and said determining whether to assign the data item to at least one cluster, with a plurality of minimum similarity threshold values to obtain a hierarchy of clusterings.

Figure 3:
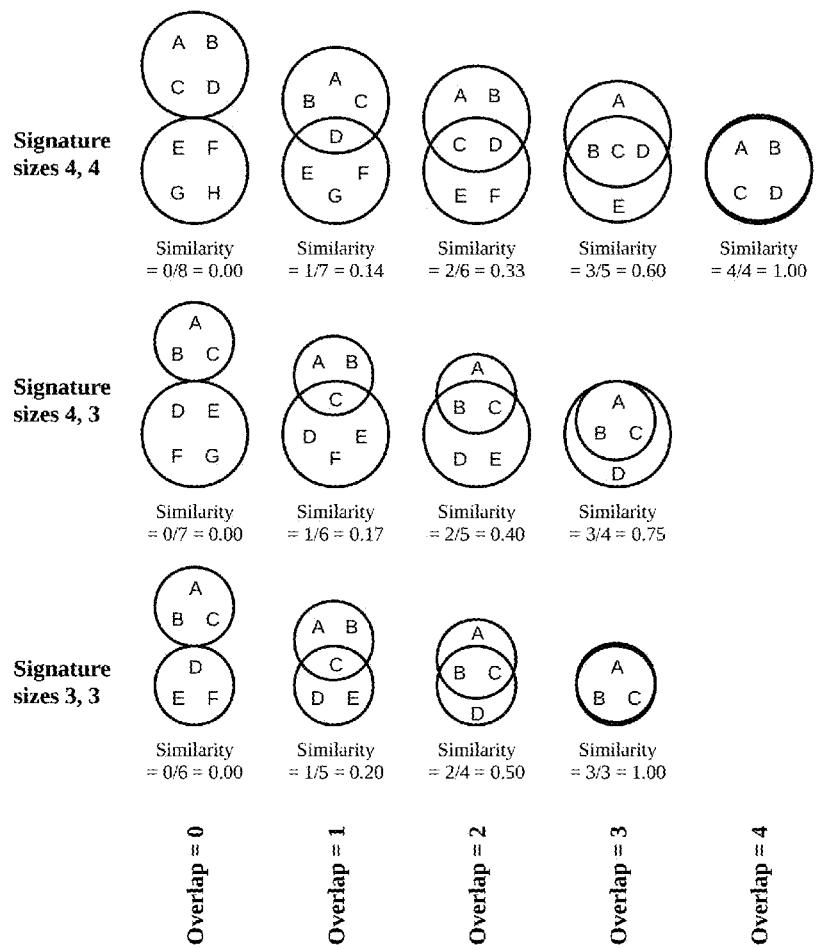
FIG. 3 illustrates an example where the membership decision on whether a data item may join an existing cluster may depend not only on the presence of a shared partial signature generated from the identified signature, but also on the number of signature elements in the original data item from which the existing tokens were generated.

FIG. 3 illustrates an example where the membership decision on whether a data item may join an existing cluster may depend not only on the presence of a shared partial signature generated from the identified signature, but also on the number of signature elements in the original data item from which the existing tokens were generated. In a worst case scenario, tokens for all partial signatures may be generated and checked.

In the example, Jaccard similarity is used, the signatures are constrained to contain 3 or 4 elements, and the matching threshold value $\theta$ is assumed to be 0.4. FIG. 3 shows that:
 two signatures, each comprising 3 elements, may be considered similar to each other if they have at least 2 elements in common;
 a signature comprising 3 elements may be considered similar to a signature comprising 4 elements if they have at least 2 elements in common; and
 two signatures, each comprising 4 elements, may be considered similar to each other if they have at least 3 elements in common.

Consequently, during the Mark-In stage for an identified signature comprising 3 elements, MIMOSA may mark tokens comprising 2-element combinations (pairs) of the signature elements. No token comprising a 3-element combination (triple) is needed, because no matter whether this identified signature is checked for similarity with a 3-element or 4-element signature, finding a matching 2-element token is both necessary and sufficient for determining whether the signatures are similar. If a matching 2-element token is found, then the two signatures are similar. If no matching 2-element token is found, then the two signatures are not similar.

However, during the Mark-In stage for an identified signature comprising 4 elements, MIMOSA may mark tokens for all pairs and all triples of the signature elements. It may mark pairs so that it can check for similarity to 3-element signatures; and it may mark triples so that it can check for similarity to 4-element signatures.

In other words, for this example, MIMOSA may keep track of the size of the original identified signature from which each token was generated. MIMOSA may use that size information when it checks for matching tokens from other signatures.

When MIMOSA identifies a signature comprising 3 elements, MIMOSA may, during the Match-Out stage, generate tokens consisting of pairs of those elements, and check whether those tokens were marked in the memory. No matter whether those marked tokens were generated for 3-element or for 4-element signatures, checking the pair tokens is necessary and sufficient for determining whether the identified signature matches another signature.

In contrast, when MIMOSA identifies a signature comprising 4 elements, MIMOSA may, during the Match-Out stage, generate tokens comprising both pairs and triples of those elements, and check whether those tokens were marked in the memory. In this case, if a marked, matching pair token was generated from another signature comprising 3 elements, then this identified signature is similar to that other signature. But if a marked, matching pair token was generated from another signature comprising 4 elements, then it is not evidence that this identified signature is similar to that other signature.

In other words, the determination of whether two signatures are similar may depend not only on their matched partial signatures, but also on the number of elements in both signatures.

One instantiation of MIMOSA may satisfy these constraints by inserting a number, representing the size of the identified signature, into each of the tokens that it marks for that identified signature, during the Mark-In stage. MIMOSA checks tokens containing those size numbers during the Match-Out stage.

Figure 4:
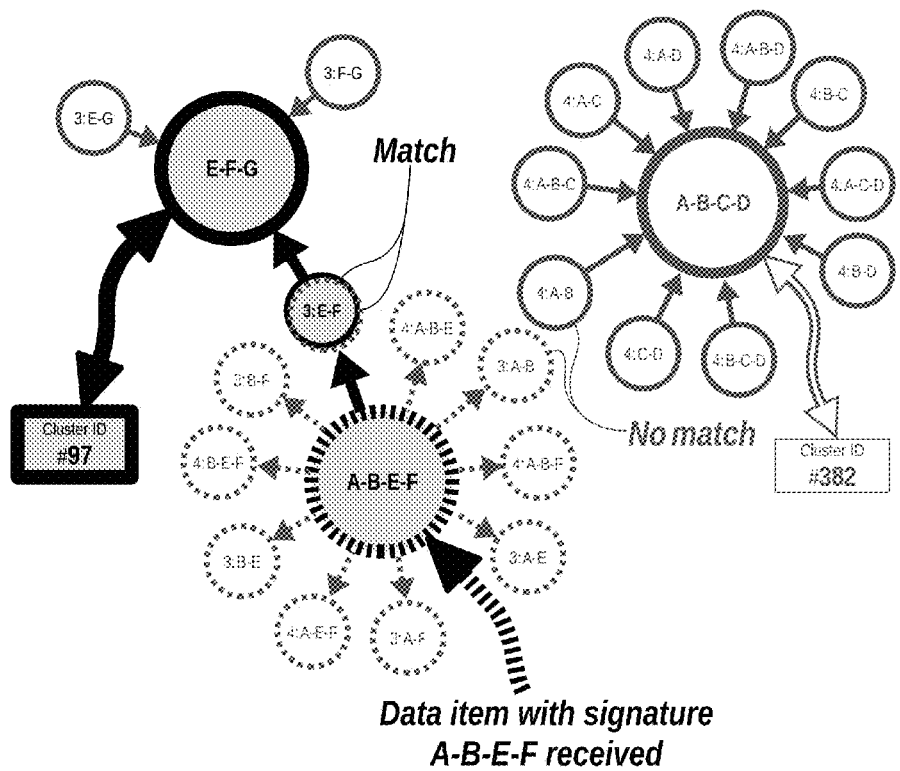
FIG. 4 illustrates one way that MIMOSA can handle the case where the elements of an identified signature overlap with the elements of other signatures whose sizes differ.

For example, as shown in FIG. 4, the tokens marked for signature A-B-C-D would be 4:A-B-C, 4:A-B-D, 4:A-C-D, 4:B-C-D, 4:A-B, 4:A-C, 4:A-D, 4:B-C, 4:B-D, and 4:C-D. The tokens marked for signature E-F-G would be 3:E-F, 3:E-G, and 3:F-G.

Then when identified signature A-B-E-F arrives, MIMOSA may directly check for token 3:E-F, and skip checking for 4:E-F. The 10 tokens that MIMOSA generates for checking input signature A-B-E-F are listed in FIG. 4. Since MIMOSA finds a match on 3:E-F, it may thereby determine that identified signature A-B-E-F is similar to signature E-F-G, and can join its cluster. MIMOSA does not find an A-B token match, because 3:A-B does not match 4:A-B. Hence MIMOSA may determine correctly that A-B-E-F is not similar to A-B-C-D.

MIMOSA may use a similarity size function, rather than a similarity measure, to derive the size values that are needed. A similarity size function is related to a similarity measure but does not require specific signatures as input. A similarity size function outputs a similarity score for two signature sizes and an overlap size, where the first signature size is $n_{MarkIn}$ elements, the second signature size is $n_{MatchOut}$ elements, and the overlap of two signatures is $n_{Overlap}$ elements in common. For example, the similarity size function for Jaccard similarity is $$\hat{s}(n_{MarkIn}, n_{MatchOut}, n_{Overlap}) = n_{Overlap}/(n_{MarkIn} + n_{MatchOut} - n_{Overlap}).$$

Referring again to FIG. 2, in an example, the processing logic 245 selecting a subset of the set of elements of the identified signature to form at least one partial signature may be based on a set of sizes of signatures, the set of sizes containing a maximum size value representing the largest number of elements in a signature.

In an example, the processing logic 245 may identify a first size value, the first size value being the number of elements of the identified signature. The processing logic 245 may identify a second size value, the second size value being the number of elements of a second signature that is similar to the identified signature. The processing logic 245 may segregate the memory 250 into a plurality of sections of memory. At least one section of the plurality of sections may be identified by a size value. The processing logic 245 determining whether the at least one token is present in the memory may further include the processing logic 245 determining whether the at least one token is present in a section of the memory identified by the size value, the size value being one of either the first size value or the second size value.

The processing logic 245 may store the at least one token into a section of the memory identified by a size value, the size value being one of either the first size value or the second size value.

The processing logic 245 combining the elements of the at least one partial signature into at least one token may further include the processing logic 245 combining a size value into the at least one token, the size value being one of either the first size value or the second size value.

More particularly, the same size value that is used when storing a token may also be used when another data item is received and its tokens are being checked in the memory. This means that both the size value and the partial signature need to match the size value and partial signature that were used during the storing operation. If a different size value is used, then a different section of memory is checked, and the partial signature may not be found. With respect to storage, the size value may be the size of the identified signature. With respect to retrieval, for another data item, the size value may be the size of a second signature that is similar to the identified signature. When that size value is so chosen, it ensures that only the tokens from signatures that are similar can match. It excludes tokens from signatures that cannot be similar to the identified signature because they have the wrong size.

In an example, a token can have two complementary functions: one function in storing a marker, the other in checking whether a marker is present or absent. Typically, the size value of the identified signature may be inserted into the token on storing; and the size value of a second signature that is similar to the identified signature may be inserted into the token on checking. In an example, this could be reversed. The purpose is to limit the matching to the tokens where the sizes of the two signatures, along with the size of their overlapping partial signature, mean that the signatures may be similar. That is, the value of the similarity size function meets the minimum similarity threshold value.

In an example, the selected subset of the set of elements of the identified signature may have a size, the size being the smallest number of elements in common between the identified signature and a second signature that is similar to the identified signature.

In an example, the identified signature may be formed using, for example, one or more of term frequency within the data item, term frequency within a corpus, stemming, MinHash, or Bloom filtering.

In an example, elements of the identified signature may be unequally weighted.

In another example, the clustering server 205 may be configured to receive a data item 210 from the client (e.g., 220a). The processing logic 245 in the clustering server 205 may be configured to identify a signature of the data item 210, the identified signature including a set of elements. The processing logic 245 may be configured to derive a first size value as the number of elements of the identified signature based on a set of size values of signatures that includes a maximum size value representing the largest number of elements in a signature. The processing logic 245 may derive a second size value as the number of elements of a second signature that is similar to the identified signature based on the set of size values of signatures. The processing logic 245 may select a subset of the set of elements of the identified signature to form at least one partial signature of the identified signature wherein the number of elements in the partial signature is the number of elements in common between a signature having the first size value and a second similar signature having the second size value. The processing logic 245 may combine the elements of the at least one partial signature into at least one token. The processing logic 245 may determine whether the at least one token is present in a memory 250, the memory 250 configured to contain an existing set of tokens. The processing logic 245 may determine whether to assign the data item to at least one cluster based on whether the at least one token is present in the memory 250. The processing logic 245 may determine whether to assign the data item to at least one cluster based on whether the at least one token is absent from the memory 250. The processing logic 245 may store the at least one token into the memory. The processing logic 245 may store a value associated with the at least one token into the memory, wherein the value represents one or more of: the identified signature, the at least one token, an identifier of a cluster to which the data item is assigned, a centroid of a cluster to which the data item is assigned, a flag value indicating that the token is marked, a probability or weight with which the data item is assigned to a cluster, information pertaining to the data item or to the cluster to which the data item is assigned, or at least one of a pointer, a link, an index, or a reference to a representation of one or more of said identified signature, said at least one token, said identifier, said centroid, said flag, said probability or weight, or said information.

The processing logic 245 may output a representation of one or more of: a determination whether to assign the data item to at least one cluster, an identifier of a cluster to which the data item is assigned, a centroid of a cluster to which the data item is assigned, a member of a cluster to which the data item is assigned, or information pertaining to the data item or to a cluster to which the data item is assigned.

The memory 250 may be further configured to contain an existing set of tokens as keys in key-value pairs. The processing logic 245 storing a value associated with the token into the memory 250 may further include the processing logic 245 storing the token as a key with the associated value, in a key-value pair.

The processing logic 245 may receive one or more of a second data item, a second signature, a second token, or an identifier of a cluster and output one or more values retrieved from the memory associated with the second data item, the second signature, the second token, or the identifier of a cluster.

In an example, the processing logic 245 may repeatedly perform said deriving a first size value, said deriving a second size value, said selecting, said combining, said determining whether the at least one token is present in a memory 250, and said determining whether to assign the data item to at least one cluster, with a plurality of minimum similarity threshold values to obtain a hierarchy of clusterings.

Figure 5:
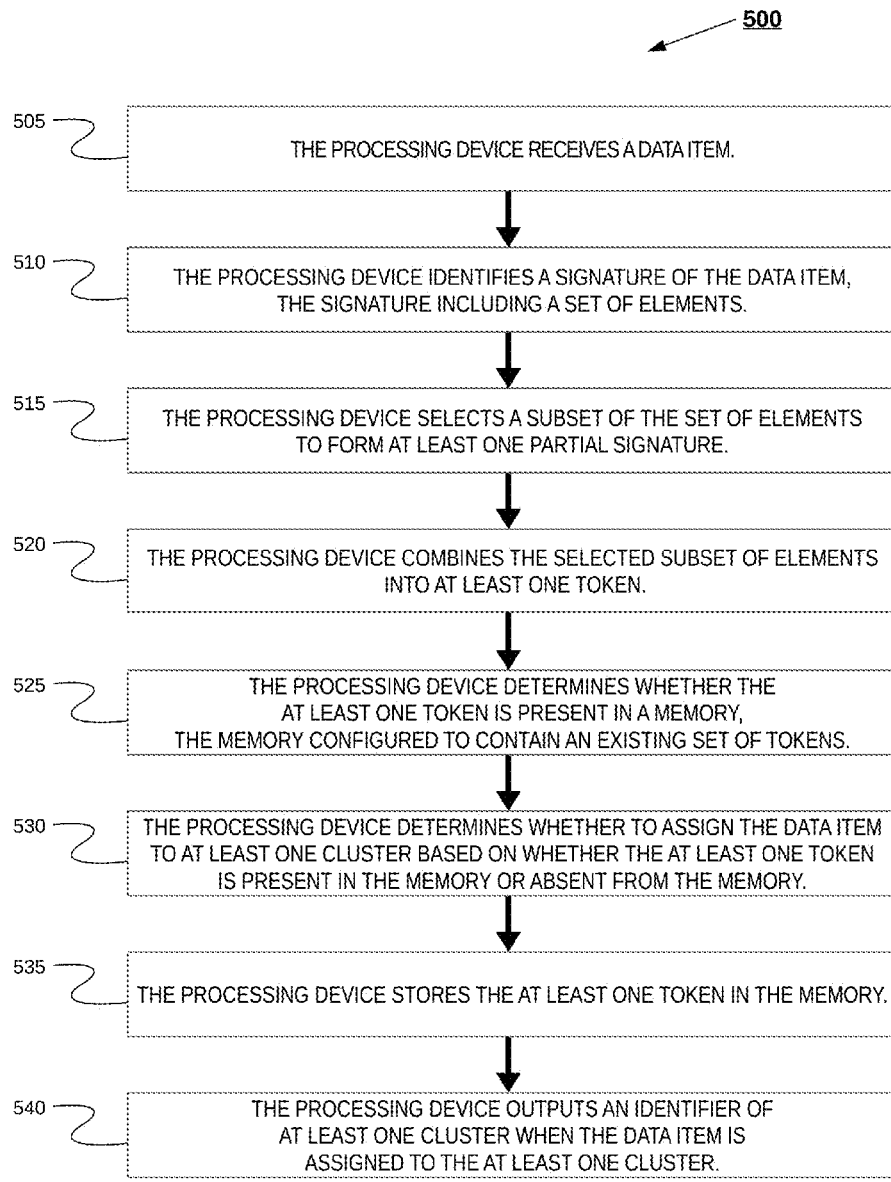
FIG. 5 is a flow diagram illustrating an example of a method to perform clustering of data items in linear time with error-free retrieval.

FIG. 5 is a flow diagram illustrating an example of a method 500 to perform clustering of data items in linear time with error-free retrieval. The method 500 may be performed by a processing device 250 of the clustering server 205 of FIG. 2 and may comprise hardware (e.g., circuitry, dedicated logic, programmable logic, microcode, etc.), software (e.g., instructions run on a processing device), or a combination thereof. In one example, the method 500 may be performed by processing logic 245 associated with a processing device 255 of the clustering server 205 of FIG. 2.

As shown in FIG. 5, at block 505, the processing device 255 may receive a data item 210. The data item 210 may be, for example, one of a news story, a genomic sequence, an epidemiological record, a webserver log entry, a webpage view record, a customer sales transaction record, an economic measurement, a marketing survey response, an industrial machine sensor reading, a manufacturing test record, a census entry, ecological observation, a seismic time-series measurement, a meteorological measurement, an astronomical observation, or a physics apparatus output record. At block 510, the processing device 255 may identify a signature of the data item 210, the identified signature including a set of elements. Identifying a signature of the data item 210 may include receiving a response to a query for a signature from the data item 210 or extracting the signature from the data item 210.

At block 515, the processing device 255 may select a subset of the elements to form at least one partial signature. The identified signature may be formed using, for example, one or more of term frequency within the data item, term frequency within a corpus, stemming, MinHash, or Bloom filtering.

At block 520, the processing device 255 may combine the selected subset of elements into at least one token. To form the at least one token, the processing device 255 may concatenate the elements of the at least one partial signature with a separator to form a string. The processing device 255 may concatenate the elements in a sorted order. The processing device 255 may combine a representation of a size value with the elements of the at least one partial signature into the at least one token. The size value may be the number of elements of a signature whose tokens are marked in the memory 250 (A-B-C-D of FIG. 4). The size value may be the number of elements of a signature that is similar to the signature whose tokens are to be checked in the memory 250 (A-B-E-F of FIG. 4).

A value of each token of the at least one token may be based in part on a sorted representation of elements of each partial signature. A value of each token may be based in part on a representation of the number of elements of the identified signature. Forming at least one token from the selected at least one partial signature may include generating a set of combinations of signature elements of the data item such that the signature of any similar data item with respect to the minimum similarity threshold value shares at least one token.

At block 525, the processing device may determine whether the at least one token is present in a memory 250, the memory 250 configured to contain an existing set of tokens. The memory 250 may be organized as a constant-time key-value memory 250. The constant-time key-value memory 250 may be one of a hash table, a map, a symbol table, an associative array, or an unordered dictionary data structure. At block 530, the processing device 255 may determine whether to assign the data item to at least one cluster based on whether the at least one token is present in the memory 250 or is absent from the memory 250.

At block 535, the processing device 255 may store the at least one token as at least one key in the memory 250. At block 540, the processing device 250 may output an identifier of at least one cluster when the data item 210 is assigned to the at least one cluster. The processing device 255 may further store a value associated with the at least one token into the memory 250, wherein the value represents one or more of: the identified signature, the at least one token, an identifier of a cluster to which the data item is assigned, a centroid of a cluster to which the data item is assigned, a flag value indicating that the token is marked, a probability or weight with which the data item is assigned to a cluster, information pertaining to the data item or to a cluster to which the data item is assigned, or at least one of a pointer, a link, an index, or a reference to a representation of one or more of said identified signature, said at least one token, said identifier, said centroid, said flag, said probability or weight, or said information.

The processing device 255 may further output a representation of one or more of: a determination whether to assign the data item to at least one cluster, an identifier of a cluster to which the data item is assigned, a centroid of a cluster to which the data item is assigned, a member of a cluster to which the data item is assigned, or information pertaining to the data item or to a cluster to which the data item is assigned.

In an example, the processing device 255 may receive one or more of a second data item, a second signature, a second token, or an identifier of a cluster. The processing device may output one or more values retrieved from the memory associated with the second data item, the second signature, the second token, or the identifier of a cluster.

The memory 250 may be further configured to contain an existing set of tokens as keys in key-value pairs. The processing device 255 storing the value associated with marker for the token into the memory may further comprise storing the token as a key with the associated value, in a key-value pair.

The processing device 255 may receive one or more of a second data item, a second signature, a second token, or an identifier of a cluster and output one or more values retrieved from the memory associated with the second data item, the second signature, the second token, or the identifier of a cluster.

In an example, at least a portion of the memory 250 may be organized as one of a hash table, a map, a symbol table, an associative array, or an unordered dictionary data structure.

The processing device 255 determining whether to assign the data item to at least one cluster may further include the processing device 255 determining whether to merge two or more clusters into one cluster, based on whether the at least one token matches two or more tokens present in the memory 250, the two or more tokens being stored in the memory 250 with two or more associated values identifying the two or more clusters. The processing device 255 determining whether to assign the data item to at least one cluster may further include the processing device 255 determining whether to split a cluster into two or more clusters.

The processing device 255 determining whether to assign the data item to at least one cluster may be based on factors including at least one of: the number of data items assigned to a cluster, a minimum similarity between the signatures of two data items in a cluster, a minimum similarity between the identified signature and a centroid of a cluster, a density of a cluster, the number of tokens in common between data items assigned to a cluster, or the number of elements in the tokens in common between data items assigned to a cluster.

The processing device 255 determining whether to assign the data item to at least one cluster may further depend on processing device 255 determining whether the identified signature is similar to a signature from which the at least one token present in the memory is formed.

The processing device 255 selecting a subset of the set of elements of the identified signature to form at least one partial signature may be based on a similarity measure of the identified signature to a second signature and on a minimum similarity threshold value. The similarity measure may be at least one of Jaccard similarity, Levenshtein similarity, a Szymkiewicz-Simpson overlap coefficient, mutual similarity, a Sørensen-Dice coefficient, or a Tversky similarity index.

The processing device 255 may repeatedly perform said deriving a first size value, said deriving a second size value, said selecting, said combining, said determining whether the at least one token is present in a memory 250, and said determining whether to assign the data item to at least one cluster, with a plurality of minimum similarity threshold values to obtain a hierarchy of clusterings.

The processing device 255 may segregate the memory 250 into a plurality of sections of memory, wherein at least one section of the plurality of sections is identified by a size value, and wherein the processing device 255 determining whether the at least one token is present in the memory further includes the processing device 255 determining whether the at least one token is present in a section of the memory identified by the size value, the size value being one of either the first size value or the second size value.

The processing device 255 may store the at least one token into a section of the memory identified by a size value, the size value being one of either the first size value or the second size value.

The processing device 255 may combine the elements of the at least one partial signature into at least one token by combining a size value into the at least one token, the size value being one of either the first size value or the second size value.

The number of elements in the partial signature may be the smallest number of elements in common between a first signature having the first size value and a second signature having the second size value that is similar to the first signature.

In an example, elements of the identified signature may be equally weighted. In an example, elements of the identified signature may be unequally weighted.

The identified signature may be formed using, for example, one or more of term frequency within the data item, term frequency within a corpus, stemming, MinHash, or Bloom filtering.

The processing device 255 may perform said deriving a first size value, said deriving a second size value, said selecting, said combining, said determining whether the at least one token is present in a memory, and said determining whether to assign the at least one data item to at least one cluster in a plurality of data items, the data items being presented either as a stream in chronological order of arrival time (serial mode) or as a batch sequentially in any order (batch mode), regardless of how the order is determined.

Figure 6:
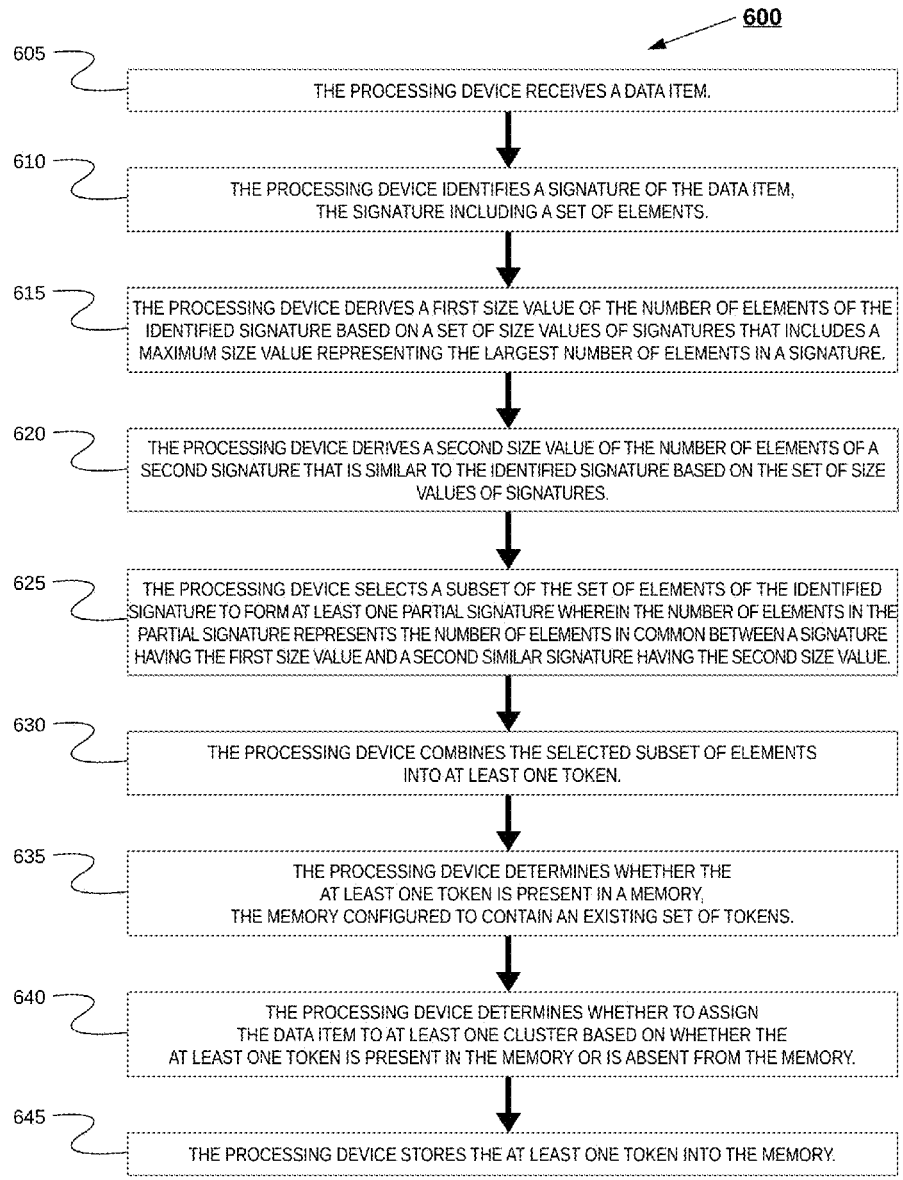
FIG. 6 is a flow diagram illustrating another example of a method to perform clustering of data items in linear time with error-free retrieval.

FIG. 6 is a flow diagram illustrating another example of a method 600 to perform clustering of data items in linear time with error-free retrieval. The method 600 may be performed by a processing device 250 of the clustering server 205 of FIG. 2 and may comprise hardware (e.g., circuitry, dedicated logic, programmable logic, microcode, etc.), software (e.g., instructions run on a processing device), or a combination thereof. In one example, the method 600 may be performed by processing logic 245 associated with a processing device 255 of the clustering server 205 of FIG. 2.

The method 600 may be performed online one data item at a time, the data items being presented in chronological order of arrival time. The method 600 may be performed on a batch of data items, the data items within the batch being presented sequentially in any order, regardless of how the order is determined.

As shown in FIG. 6, at block 605, the processing device 255 may receive a data item 210. The data item 210 may represent, for example, one of a news story, a genomic sequence, an epidemiological record, a webserver log entry, a webpage view record, a customer sales transaction record, an economic measurement, a marketing survey response, an industrial machine sensor reading, a manufacturing test record, a census entry, an ecological observation, a seismic time-series measurement, a meteorological measurement, an astronomical observations, or a physics apparatus output record. At block 610, the processing device 255 may identify a signature of the data item, the signature including a set of elements. At block 615, the processing device may derive a first size value of the number of elements of the identified signature based on a set of size values of signatures that includes a maximum size value representing the largest number of elements in a signature. At block 620, the processing device 255 may derive a second size value of the number of elements of a second signature that is similar to the identified signature based on the set of size values of signatures. At block 625, the processing device 255 may select a subset of the set of elements of the identified signature to form at least one partial signature of the identified signature wherein the number of elements in the partial signature represents the number of elements in common between a signature having the first size value and a second similar signature having the second size value. At block 630, the processing device 255 may combine the selected subset of elements into at least one token. At block 635, the processing device 255 may determine whether the at least one token is present in a memory 250, the memory 250 configured to contain an existing set of tokens. At block 640, the processing device 255 may determine whether to assign the data item to at least one cluster based on whether the at least one token is present in the memory 250 or is absent from the memory 250.

In an example, the processing device 255 determining whether to assign the data item to at least one cluster may be based on whether the at least one token is absent from the memory.

At block 645, the processing device 255 may store the at least one token into the memory 250. The processing device 255 may store the value associated with the at least one token into the memory, wherein the value represents one or more of: the identified signature, the at least one token, an identifier of a cluster to which the data item is assigned, a centroid of a cluster to which the data item is assigned, a flag value indicating that the token is marked, a probability or weight with which the data item is assigned to a cluster, information pertaining to the data item or to a cluster to which the data item is assigned, or at least one of a pointer, a link, an index, or a reference to a representation of one or more of said identified signature, said at least one token, said identifier, said centroid, said flag, said probability or weight, or said information.

The processing device 255 may output a representation of one or more of: a determination whether to assign the data item to at least one cluster, an identifier of a cluster to which the data item is assigned, a centroid of a cluster to which the data item is assigned, a member of a cluster to which the data item is assigned, or information pertaining to the data item or to a cluster to which the data item is assigned.

The memory 250 may be further configured to contain an existing set of tokens as keys in key-value pairs. The processing device 255 storing the value associated with the token into the memory 250 may further include the processing device 255 storing the token as a key with the associated value, in a key-value pair.

The processing device 255 may receive one or more of a second data item, a second signature, a second token, or an identifier of a cluster, and output one or more values retrieved from the memory associated with the second data item, the second signature, the second token, or the identifier of a cluster.

At least a portion of the memory 250 may be organized as one of a hash table, a map, a symbol table, an associative array, or an unordered dictionary data structure.

The processing device 255 combining the elements of the at least one partial signature may further include the processing device 255 concatenating the selected elements with a separator to form a string as the token.

The processing device 255 combining the elements of the at least one partial signature may be based on a sorted representation of the said elements.

The processing device 255 determining whether to assign the data item to at least one cluster further include the processing device 255 determining whether to merge two or more clusters into one cluster, based on whether the at least one token matches two or more tokens present in the memory, the two or more tokens being stored in the memory 250 with two or more associated values identifying the two or more clusters. The processing device 255 determining whether to assign the data item to at least one cluster further include the processing device 255 determining whether to split a cluster into two or more clusters.

The processing device 255 determining whether to assign the data item to at least one cluster may be further based on factors including at least one of: the number of data items assigned to a cluster, a minimum similarity between the signatures of two data items in a cluster, a minimum similarity between the identified signature and a centroid of a cluster, a density of a cluster, the number of tokens in common between data items assigned to a cluster, or the number of elements in the tokens in common between data items assigned to a cluster.

The processing device 255 determining whether to assign the data item to at least one cluster may further depend on the processing device 255 determining whether the identified signature is similar to a signature from which the at least one token present in the memory is formed.

The processing device 255 selecting a subset of the set of elements of the identified signature to form at least one partial signature may be based on a similarity measure of the identified signature to a second signature and on a minimum similarity threshold value. The similarity measure may be at least one of Jaccard similarity, Levenshtein similarity, a Szymkiewicz-Simpson overlap coefficient, mutual similarity, a Sørensen-Dice coefficient, or a Tversky similarity index.

The processing device 255 may repeatedly perform said deriving a first size value, said deriving a second size value, said selecting, said combining, said determining whether the at least one token is present in a memory, and said determining whether to assign the data item to at least one cluster, with a plurality of minimum similarity threshold values to obtain a hierarchy of clusterings.

The processing device 255 may segregate the memory 255 into a plurality of sections of memory, wherein at least one section of the plurality of sections is identified by a size value, and wherein determining whether the at least one token is present in the memory further comprises determining whether the at least one token is present in a section of the memory identified by the size value, the size value being one of either the first size value or the second size value.

The processing device 255 may store the at least one token into a section of the memory 250 identified by a size value, the size value being one of either the first size value or the second size value.

The processing device 255 combining the elements of the at least one partial signature into at least one token may further include the processing device 255 combining a size value into the at least one token, the size value being one of either the first size value or the second size value.

The number of elements in the partial signature may be the smallest number of elements in common between a first signature having the first size value and a second signature having the second size value that is similar to the first signature.

In an example, elements of the identified signature may be equally weighted. In an example, elements of the identified signature may be unequally weighted.

The identified signature may be formed using, for example, one or more of term frequency within the data item, term frequency within a corpus, stemming, MinHash, or Bloom filtering.

The processing device 255 may perform said deriving a first size value, said deriving a second size value, said selecting, said combining, said determining whether the at least one token is present in a memory 250, and said determining whether to assign the at least one data item 210 to at least one cluster in a plurality of data items, the data items being presented either as a stream in chronological order of arrival time or as a batch sequentially in any order, regardless of how the order is determined.

One common similarity measure is the Hamming index. In a universe where each data item is a set of elements drawn from a set of n allowable elements, an item may be represented by an n-bit vector where each 1 represents an element that is present in the set, and each 0 represents an element that is absent. Then the Hamming similarity between two signatures $X=\{x_1 x_2 x_3 \ldots x_n\}$ and $Y=\{y_1 y_2 y_3 \ldots y_n\}$, where $x_i, y_i \in \{0,1\}$, is $H(X,Y) = |\{x_i = y_i\}|/n$. Hamming similarity is widely used in many applications, but it requires that the full dimension n of the system be known, and that both data items have the same dimension. Other similarity measures, such as Levenshtein similarity (edit similarity), add complexities to allow the degree of similarity to be measured between two signatures whose dimensions differ. Because Hamming similarity uses the position of each element within a signature, it may be considered a string similarity measure.

Some methods of computing similarity incorporate an enumeration step for combinations of signature elements—but in fact researchers discussing this step teach away from using it. For example, the brute-force approach of enumerating and comparing all pairs of data elements is "obviously prohibitively expensive for large datasets" (see Xiao et al., 2011); likewise, the number of pairs of records that share at least one signature element "is often prohibitively large" (Xiao et al., 2011).

The All-Pairs methods (see Bayardo R J, Ma Y, Srikant R (2007), "Scaling up All Pairs similarity search," *Proc. 16$^{th}$ Int. Conf World Wide Web*, 131-140) avoids enumerating all pairs of data elements by pruning dynamically according to size constraints. The PartEnum method (see Arasu et al. (2006) and Arasu A, Ganti G, Shriraghav K (2011), "Efficient exact set similarity joins," U.S. Pat. No. 7,865,505) tries to minimize the enumerations of all combinations of elements by partitioning the known set of input dimensions, citing the "drawback" of large enumeration size. The HmSearch method enumerates signatures from which one element is deleted (see Zhang et al., 2013), but the authors state that when the number of symbol entities in the data universe is much larger than 2 (a binary Hamming alphabet), an index required for constant-time queries "will incur excessive amount of space usage (and building time)."

Clustering methods are commonly tailored to the needs of the application at hand. (See Hennig C (2016), "Clustering strategy and method selection" in Hennig C, Meila M, Murtagh F, Rocci R, *Handbook of Cluster Analysis*, Chapter 31, 703-730, CRC Press.) The following examples illustrate some existing variants in clustering methods.

Online Vs. Batch.

In some applications, data items arrive in an ongoing sequence, and each data item is clustered in relation to prior data—being processed online (i.e., in chronological order of arrival). In other applications, the data set is fixed, and clustering is performed once on the entire batch of data (see Barbakh W, Fyfe C (2008), "Online clustering algorithms," *Int. J. Neural Systems*, 18(3):1-10).

In batch clustering applications, there may not exist an obvious chronological ordering in which the data items are to be clustered. The order of processing may affect the clusters that are produced—for example, when a data item is similar to other data items in more than one cluster. The determination of which cluster the data item should join can be affected by which of the other data items has already been processed. The order in which the clustering method processes the data items may be random or pseudorandom, or may be deterministic, based on chronology or other attributes of the data items.

Hierarchical.

In some applications, clusters agglomerate, becoming sequentially bigger and fewer. In other applications, clusters divide, splitting into a larger number of smaller clusters (see Jain et al., 1999).

Centroid.

In some applications, a centroid value is calculated for each cluster, standing in for the members of the cluster in similarity computations or in output (see Xu & Wunsch, 2005). This can speed the clustering process, as each data item is compared only with the cluster centroids, rather than with all the data items themselves (a larger number). Nevertheless, when no fixed limit is placed on the number of clusters, centroid methods for clustering still have $O(n^2)$ time complexity, as the number of computational steps required per data item grows with the number of data items added.

Membership Decision Factors.

In some applications, the decision of whether a data item should join a particular cluster depends on the item's similarity to the existing members of the cluster; in other applications, the decision depends on the item's similarity to the centroid. In some applications, the decision depends on the number of members of the cluster. In some applications, the decision depends on the shape of the cluster in a high-dimensional space. In some applications, the decision depends on a combination of factors—such as density (similarity and number of members) (see Xu & Tian, 2015).

Weighting.

Basic set-similarity methods support only binary comparison: a signature element is either present or absent within a data item. However, for some applications, certain elements are considered more important than others. It is common to augment a basic similarity calculation with methods that allow graded weightings of signature elements (see Ioffe S (2010), "Improved consistent sampling, weighted Minhash and L1 sketching," *Proc. 10th IEEE Int. Conf Data Mining*, 246-255). For example, a basic, binary set-similarity calculation can serve as an initial screen, excluding data items that fail to meet a minimum threshold similarity value; and then a secondary calculation determines a more precise similarity score, weighting elements according to importance.

Approximate.

Heretofore some of the fastest methods for similarity measurement have been approximate or inexact. They achieve linear or near-linear time complexity by using functions that assert the similarity of data items probabilistically—and hence can result in some similar item being falsely omitted from retrieval, as if dissimilar. Given a fixed tolerance for errors, say 1%, certain similarity measures are devised which operate in linear time—with lower tolerance costing greater computational effort. A common class of methods for approximate similarity measurement is Locality-Sensitive Hashing, or LSH (see Gionis A, Indyk P, Motwani R (1999) "Similarity search in high dimensions via hashing," *Proc. 25th Int. Conf. Very Large Data Bases*, 518-529; and Leskovec et al., 2014). Approximate methods are suitable in applications of clustering that can tolerate a small fraction of erroneous responses; however, they are unsuitable where exact similarity measurements with error-free retrieval are required.

Partitioning.

Some applications may require a more complex calculation to determine admission into a cluster. For example, a news clustering application may require that 60% of the companies identified in two news stories match, 75% of the people to match, and 50% of other important keywords or key phrases to match. A solution might partition the task into three separate clustering calculations—one each on company names, person names, and additional keywords or key phrases—where the individual calculations are combined with an operation such as logical AND.

Multi-Cluster Membership.

Some applications may require that data items be allowed to belong to more than one cluster. The membership can be overlapping, or can be probabilistic or fuzzy (see Yang M S (1993), "A survey of fuzzy clustering," *Mathematical and Computer Modelling* 18(11):1-16). For example, in economics, a clustering analysis of company industries may benefit from multi-cluster membership, where certain conglomerate companies do business in multiple industries.

Figure 7A:
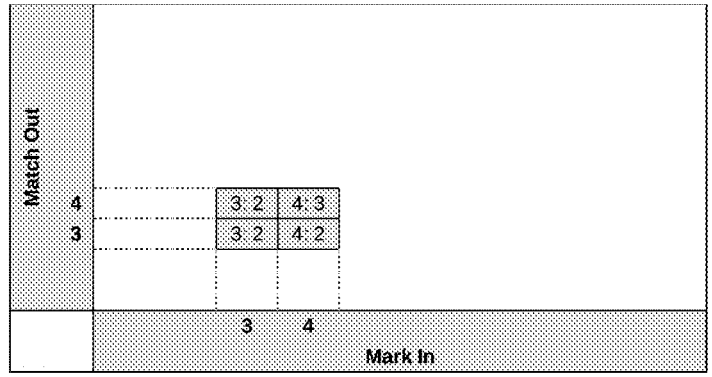
FIG. 7A is a table, called the MIMO table, that depicts the marking and matching constraints for the example in FIGS. 3-4.

FIG. 7A is a table, called a MIMO table, that depicts the marking and matching constraints for the example in FIGS. 3-4. The sizes (3 and 4) of the signatures allowed in this example are shown on the axes. The horizontal axis represents the size (number of elements) of a signature at the Mark-In stage. The vertical axis represents the size of a signature at the Match-Out stage. Each box in the grid contains two numbers, a:b. The number a represents the size of the signature which an instantiation of MIMOSA may insert into each token during the Mark-In stage. The number b represents the number of elements in each of the tokens to be generated from the identified signature.

MIMOSA's actions may be driven by the MIMO table during both the Match-Out stage and the Mark-In stage. For instance, the grid box at coordinate (3, 4) contains the numbers 3:2. This means that when MIMOSA identifies a signature of size 3, such as H-I-J, during the Mark-In stage MIMOSA may generate all tokens with combinations of 2 elements, and insert the number 3 into each of them: 3:H-I, 3:H-J, and 3: I-J. Since the grid box at coordinate (3, 3) also contains 3:2, these are the tokens that it may generate for the purpose of matching a signature of either size 3 or size 4. The tokens that MIMOSA generates for the Mark-In stage are called MI tokens. An MI token may include a number called an MI size value. An MI size value may be the size of the identified signature, An MI token also includes a partial signature comprising a combination of the elements of the identified signature.

When MIMOSA identifies a signature, during the Mark-In stage MIMOSA may generate MI tokens corresponding to all the MIMO table entries in the vertical column of grid boxes at the horizontal coordinate corresponding to the size of the identified signature. So, for example, FIG. 7A indicates that when MIMOSA identifies the signature K-L-M-N, during the Mark-In stage it may generate pairs (4:2) and triples (4:3), inserting the number 4 to form each MI token: 4:K-L, 4:K-M, 4:K-N, 4:L-M, 4:L-N, 4:M-N, 4:K-L-M, 4:K-L-N, 4:K-M-N, 4:L-M-N.

When MIMOSA identifies a signature, during the Match-Out stage MIMOSA may generate tokens corresponding to all the MIMO table entries in the horizontal row of grid boxes at the vertical coordinate corresponding to the size of the identified signature. So, for example, FIG. 6A indicates that when MIMOSA identifies the signature O-P-Q. during the Match-Out stage MIMOSA may generate all pairs (size 2), inserting the numbers 3 and 4 into each token: 3:O-P, 3:O-Q, 3:P-Q, 4:O-P, 4:O-Q, 4:P-Q. The tokens that MIMOSA generates for the Match-Out stage are called MO tokens. An MO token may include a number called an MO size value. An MO size value may be the size of a second signature that is similar to the identified signature, (MIMOSA does not require identifying such a second signature; it merely uses the sizes of such signatures, which can be computed using the similarity size function, without reference to a particular signature.) An MO token also includes a partial signature comprising a combination of the elements of the identified signature.

MIMOSA may then check whether any of these MO tokens was marked in memory (which could have happened during the Mark-In stage for another data item). If MIMOSA finds a marker for one of the MO tokens, MIMOSA may retrieve a cluster ID from the marker value, and use the cluster ID to assign the identified signature to the same cluster as that other data item.

An instantiation of MIMOSA may create the MIMO table during initialization, before receiving any data items. In creating the MIMO table, MIMOSA may use three inputs to initialization:

a minimum similarity threshold value θ,
a list A of the allowable signature sizes in the input, and
a similarity size function ŝ( ).

MIMOSA may use these three inputs to create the MIMO table. MIMOSA may invoke the similarity size function repeatedly, using all combinations of $n_{MarkIn}$ and $n_{MatchOut}$ values from the list A, with all valid $n_{Overlap}$ values in the range of 1 to max(A). For each ($n_{MarkIn}$,$n_{MatchOut}$) combination, MIMOSA may choose the smallest $n_{Overlap}$ value (if one exists) where the similarity score is greater than or equal to the threshold value, and place it into the table, along with the $n_{MarkIn}$ value, at the ($n_{MarkIn}$,$n_{MatchOut}$) grid position. If no such value exists, MIMOSA may leave the ($n_{MarkIn}$, $n_{MatchOut}$) grid position empty.

For each input data item, during the Match-Out stage, an instantiation of MIMOSA may find the horizontal row in the MIMO table with vertical coordinate that corresponds to the number of elements in the identified signature of the data item. MIMOSA may use the table entries in that row to determine which MO tokens to check in memory. If such an MO token is found marked in memory, it indicates a data item with which the data item may cluster.

For each input data item, during the Mark-In stage, an instantiation of MIMOSA may use the MIMO table in determining which tokens to mark in memory. MIMOSA may find the vertical column in the table with horizontal coordinate that corresponds to the number of elements in the identified signature of the data item. MIMOSA may use the table entries in that column to create MI tokens and mark them in memory.

Figure 7B:
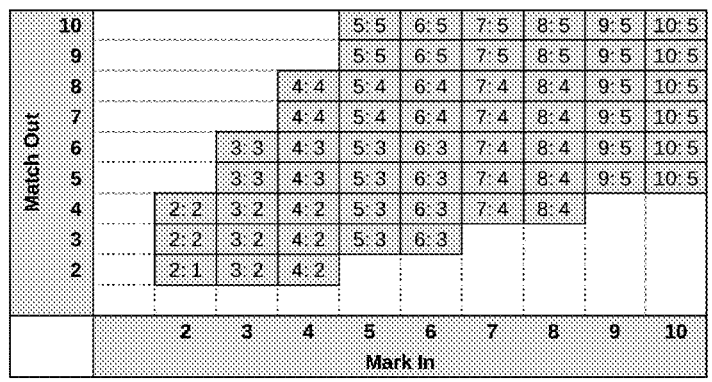
FIG. 7B shows the MIMO table for a larger example, illustrated in FIGS. 8A and 8B.
Figure 8B:
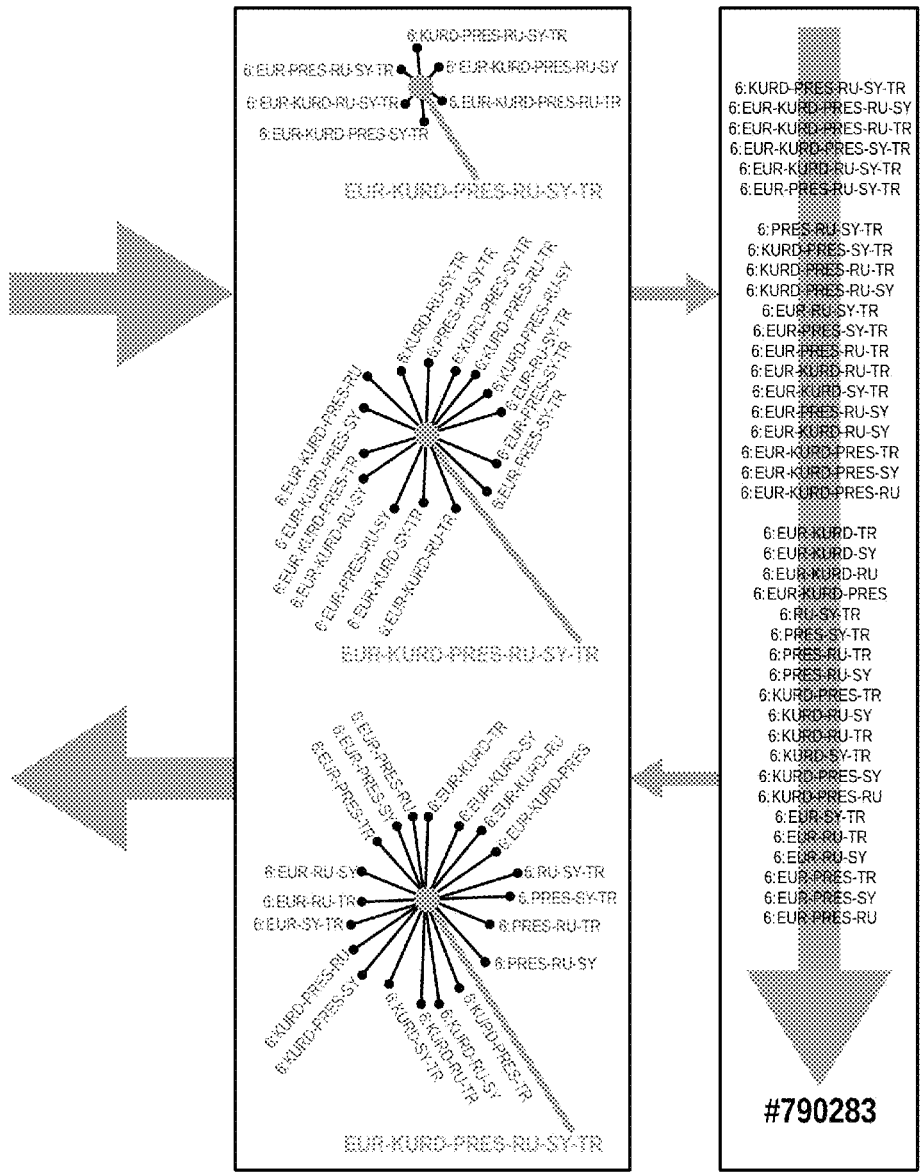
FIG. 8B shows the MI tokens that MIMOSA may generate for one identified signature using the MIMO table in FIG. 7B.

FIG. 7B shows the MIMO table for a larger example, illustrated in FIGS. 8A and 8B. Here, mutual similarity is used, with the mutual similarity size function $$\hat{s}(n_{MarkIn},n_{MatchOut},n_{Overlap})=n_{Overlap}/\max(n_{MarkIn},n_{MatchOut}).$$

The signatures are assumed to contain 2-10 elements, so A={2,3,4,5,6,7,8,9,10}, and the minimum matching threshold θ is assumed to be 0.5.

Note that in FIG. 7B, all of the entries in column 9 have the same value, and all of the entries in column 10 have the same value. Consequently, under the given minimum threshold value, list of allowable signature sizes, and similarity size function, an identified signature of size 9 or 10 can match another signature of any size, on tokens of a single size. In this example, the single size is 5; so when a signature of size 9 or 10 is identified, only tokens of size 5 need to be checked.

When all the entries in a column of the MIMO table are the same, the Mark-In stage may omit inserting the size value into the MI tokens generated for signatures of that size. Likewise, in that case, the Match-Out stage may omit inserting the size value into the MO tokens checked for signatures of that size. Further, in some examples of a MIMO table (such as the example of FIG. 2), the entries within every column may all have the same value. In those cases, MIMOSA may use the partial signatures directly as tokens, without inserting size values from the MIMO table at all.

FIG. 8A shows the MO tokens that MIMOSA may generate for one identified signature using the MIMO table in FIG. 7B. In the example, signatures may have between 2 and 10 elements. One identified signature is EUR-KURD-PRES-RU-SY-TR, which contains 6 elements. If another signature contains 10 elements, the other signature may potentially match the identified signature if it contains 5 elements in common with the identified signature. If another input signature contains 3 elements, it may potentially match the identified signature if it has all 3 of those elements in common with the identified signature. Therefore, all combinations of 3, 4, or 5 of the identified signature's elements may be used as partial signatures.

Partial signatures of size 1 and 2 are not used for this identified signature, because no signature with 1 or 2 elements can attain a mutual similarity score of at least 0.5 with this 6-element signature.

Partial signatures of size 6 and larger are not used for this identified signature, because if any signature of size 10 or less attains a mutual similarity score of at least 0.5 with this 6-element signature, it also matches one or more of the partial signatures of size 5 or smaller. Hence partial signatures of size 6 and larger are not needed, and may be omitted for efficiency.

The MO size values for this signature are {3,4,5,6} for the partial signatures of size 3, {7,8} for the partial signatures of size 4, and {9,10} for the partial signatures of size 5. FIG. 8A lists the MO tokens generated for which combine the MO size values with the corresponding partial signatures for EUR-KURD-PRES-RU-SY-TR. There are $$2 \times \binom{6}{5} = 12$$

MO tokens for the partial signatures of size 5, $$2 \times \binom{6}{4} = 30$$

MO tokens for partial signatures of size 4, and $$4 \times \binom{6}{3} = 80$$

MO tokens for partial signatures of size 3—a total of 122 MO tokens that MIMOSA checks in the hash table for this input.

FIG. 8B shows the $$\binom{6}{5} = 6$$

MI tokens of size 5, $$\binom{6}{4} = 15$$

MI tokens of size 4, and $$\binom{6}{3} = 20$$

MI tokens of size 3—a total of 41 MI tokens that MIMOSA marks in the hash table for this input.

Figure 9:
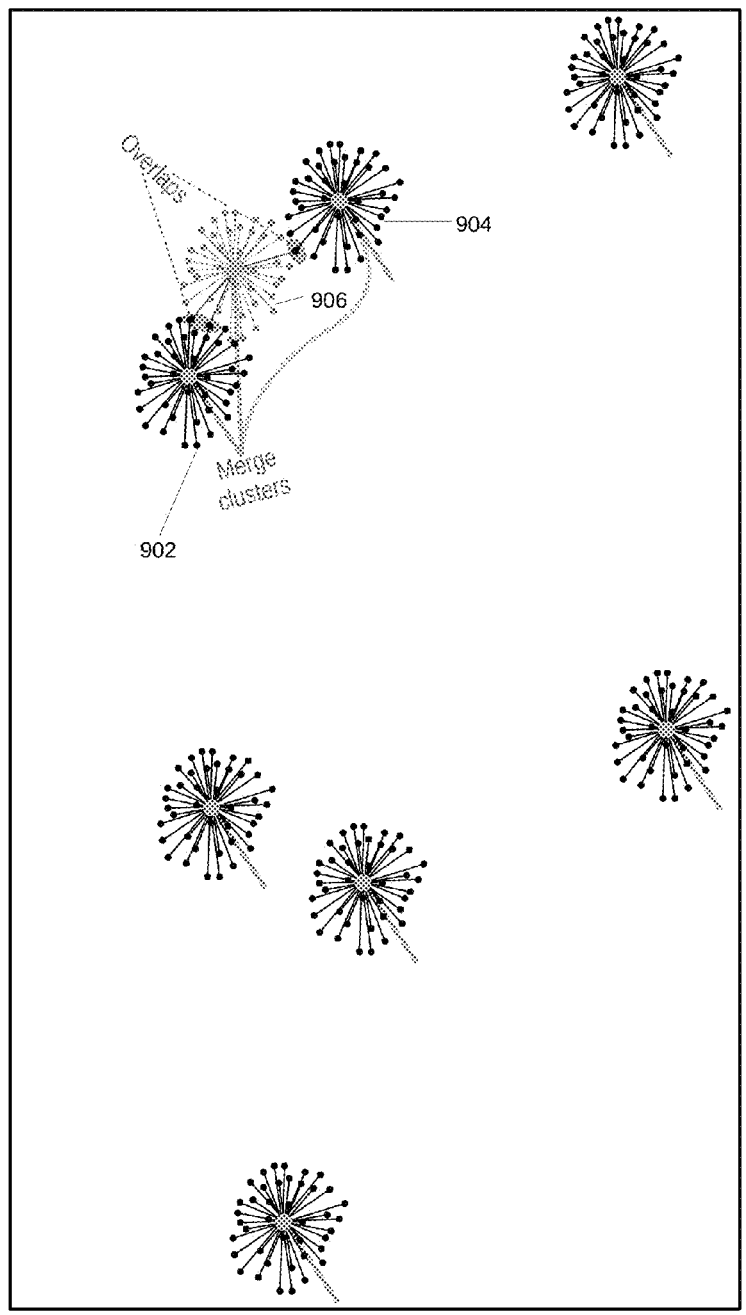
FIG. 9 depicts one way that MIMOSA may handle the case where a data item is similar to other data items belonging to more than one cluster.

The example of FIG. 9 depicts one way that MIMOSA may handle the case where a data item is similar to other data items belonging to more than one cluster. In FIG. 9, two data items (902 and 904) are members of different clusters. A new data item (906) arrives and overlaps with both 902 and 904. The two clusters may be merged into a single, larger cluster, and the new data item added to that cluster.

Figure 10A:
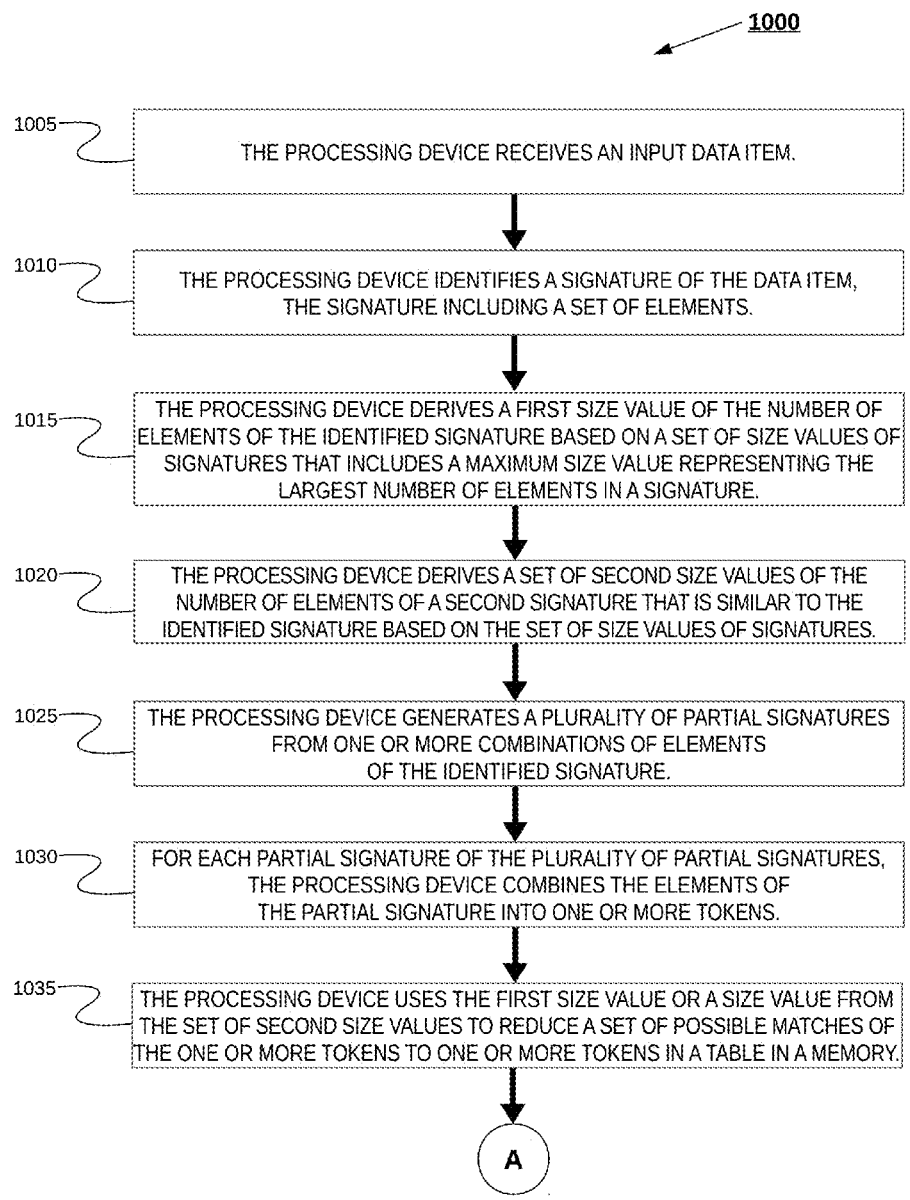
FIGS. 10A-10C are a flow diagram illustrating an example MIMOSA clustering method to process input data items to assign them to clusters.
Figure 10B:
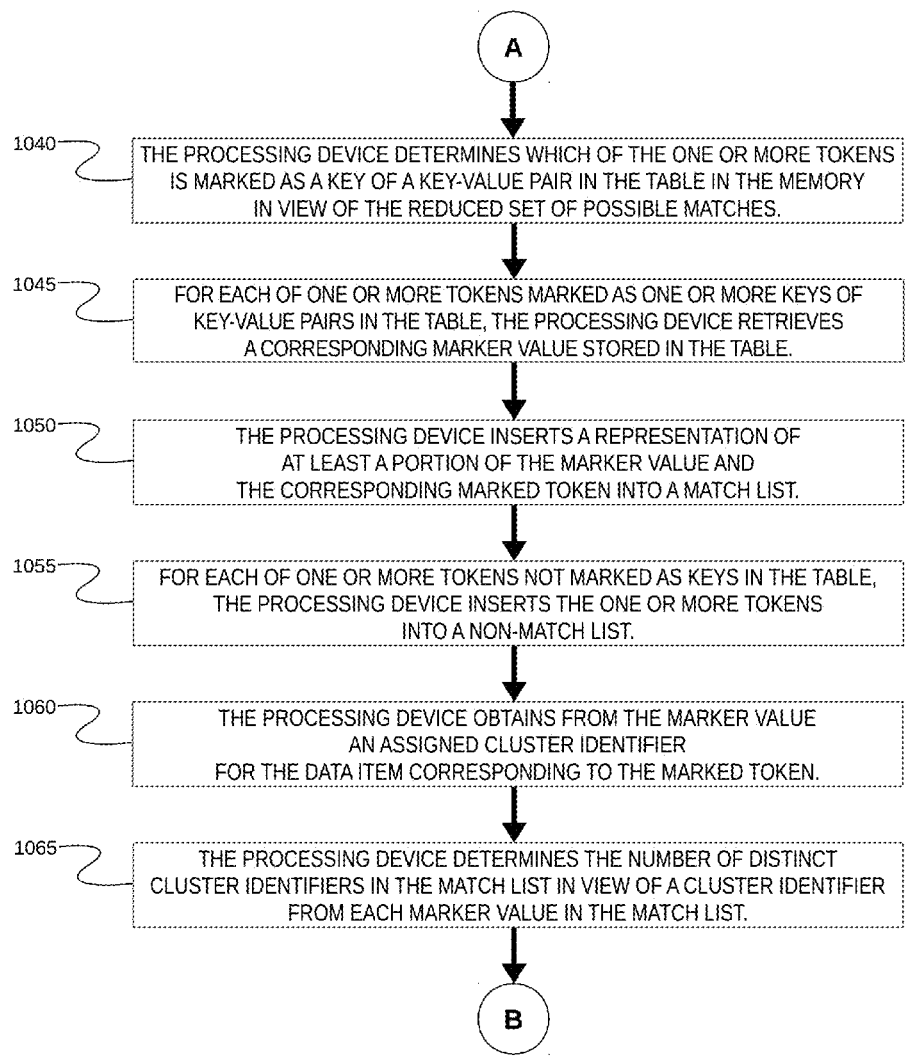
Figure 10C:
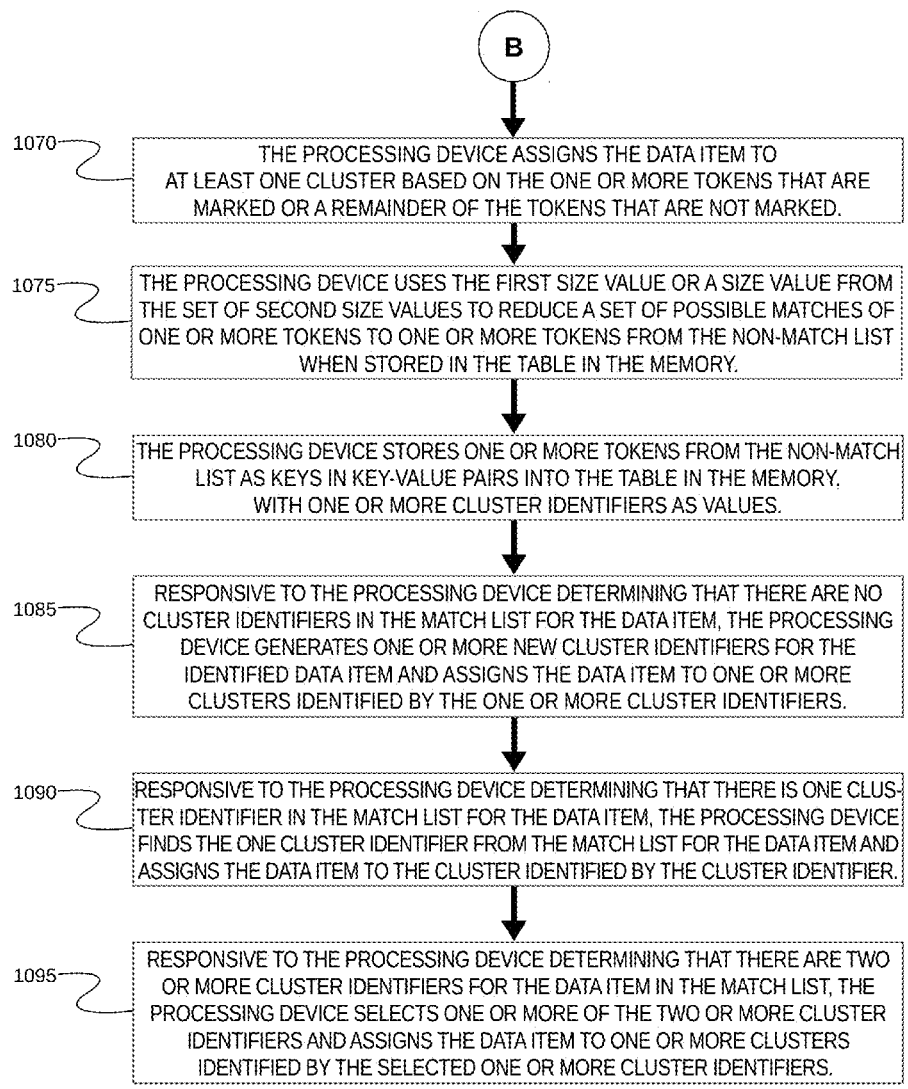

FIGS. 10A-10C are a flow diagram illustrating an example method 1000 to determine whether to assign a data item to at least one cluster of data items. The method 1000 may be performed by a processing device 255 of the clustering server 205 of FIG. 2 and may comprise hardware (e.g., circuitry, dedicated logic, programmable logic, microcode, etc.), software (e.g., instructions run on a processing device), or a combination thereof. In one example, the method 1000 may be performed by processing logic 245 associated with a processing device 255 of the clustering server 205 of FIG. 2.

As shown in FIGS. 2 and 10A, at block 1005, the processing device 255 may receive an input data item 210. At block 1010, the processing device 255 may identify a signature of the data item 210, the signature including a set of elements. At block 1015, the processing device 255 may derive a first size value of the number of elements of the identified signature based on a set of size values of signatures that includes a maximum size value representing the largest number of elements in a signature. This size is termed the MI (Mark-In) size values for the identified signature size.

At block 1020, the processing device 255 may derive a set of second size values of the number of elements of a second signature that is similar to the identified signature based on the set of size values of signatures. The processing device 255 may use a MIMO table or other data structure to facilitate determining the sizes of the partial signatures to generate. These sizes are termed the MO (Match-Out) size values for the identified signature size. The processing device 255 may use a MIMO table or other data structure to facilitate determining the MO size values. The number of elements of the at least one partial signature may be the smallest number of elements in common between a first signature having the first size value and a second signature having a size value from the set of second size values that is similar to the first signature.

At block 1025, the processing device 255 may generate a plurality of partial signatures from one or more combinations of elements of the identified signature.

At block 1030, for each partial signature of the plurality of partial signatures, the processing device 255 may combine the elements of the partial signature into one or more tokens. Combining the elements of the one or more partial signature may further include concatenating the selected elements with a separator to form a string. Combining the elements of the at least one partial signature may be based on a sorted representation of the said elements.

At block 1035, the processing device 255 may use the first size value or a size value from the set of second size values to reduce a set of possible matches of the one or more tokens to one or more tokens in a table in a memory 250. The processing device 255 using the first size value or a size value from the set of second size values may further include the processing device storing the one or more tokens into a section of the memory 250 identified by a size value, the size value being one of either the first size value or a value from the set of second size values. The processing device 255 using the first size value or a size value from the set of second size values may further include the processing device combining the elements of the at least one partial signature with a size value into the one or more tokens, the size value being one of either the first size value or a value from the set of second size values. When an MI size value is combined into a token, the token is called an MI token. When an MO size value is combined into a token, the token is called an MO token.

At block 1040, the processing device 255 may determine which of the one or more tokens is marked as a key of a key-value pair in the table in the memory 250 in view of the reduced set of possible matches.

At block 1045, for each of one or more tokens marked as one or more keys of key-value pairs in the table, the processing device 255 may retrieve a corresponding marker value stored in the table. At block 1050, the processing device 255 may insert a representation of at least a portion of the marker value and the corresponding marked token into a match list. At block 1055, for each of one or more tokens not marked as keys in the table, the processing device 255 may insert the one or more tokens into a non-match list. At block 1060, the processing device 255 may obtain from the marker value an assigned cluster identifier for the data item 210 corresponding to the marked token. At block 1065, the processing device 255 may determine the number of distinct cluster identifiers in the match list in view of a cluster identifier from each marker value in the match list.

At block 1070, the processing device 255 may assign the data item 210 to at least one cluster based on the one or more tokens that are marked or a remainder of the tokens that are not marked. At block 1075, the processing device 255 may use the first size value or a size value from the set of second size values to reduce a set of possible matches of one or more tokens to one or more tokens from the non-match list when stored in the table in the memory 250. At block 1080, the processing device 255 may store one or more tokens from the non-match list as keys in key-value pairs into the table in the memory 250, with one or more cluster identifiers as values.

At block 1085, the processing device 255 assigning the data item to at least one cluster may further include the processing device 255 determining that there are no cluster identifiers in the match list for the data item 210, generating one or more new cluster identifiers for the identified data item 210, and assigning the data item to one or more new clusters identified by the one or more new cluster identifiers. At block 1090, the processing device 255 assigning the data item to at least one cluster may further include the processing device 255 determining that there is one cluster identifier in the match list for the data item 210, finding the one cluster identifier for the data item 210 from the match list, and assigning the data item to the cluster identified by the one cluster identifier. At block 1095, the processing device 255 assigning the data item to at least one cluster may further include the processing device 255 determining that there are two or more cluster identifiers for the data item 210 in the match list, selecting one or more of the two or more cluster identifiers, and assigning the data item to one or more clusters identified by the selected one or more cluster identifiers. Responsive to the processing device 255 determining that there are two or more cluster identifiers for the data item 210 in the match list, the processing device 255 may merge two or more clusters into one cluster. Responsive to the processing device 255 determining that there are one or more cluster identifiers for the data item 210 in the match list, the processing device 255 may split a cluster of the one or more clusters into two or more clusters.

In an example, the processing device 255 selecting one or more of the two or more cluster identifiers may include the processing device 255 selecting one or more cluster identifiers in the match list that are one or more of: the earliest-generated cluster identifiers, the latest-generated cluster identifiers, the cluster identifiers of clusters whose centroid is most similar to the identified signature, the cluster identifiers of clusters containing a data item 210 whose signature is most similar to the identified signature, the cluster identifiers of clusters containing data items 210 whose signatures are all most similar to the identified signature.

In an example, the processing device 255 may repeatedly perform said identifying, said deriving a first size value, said deriving a set of second size values, said generating, for each partial signature said combining, said using, and said determining, and said assigning, with a plurality of minimum similarity threshold values to obtain a hierarchy of clusterings.

In an example, the processing device 255 may store a marker value associated with the one or more tokens as a value in key-value pairs into the table in the memory. The value may represent one or more of: the identified signature, the at least one token, an identifier of a cluster to which the data item 210 is assigned, a centroid of a cluster to which the data item 210 is assigned, a flag value indicating that the token is marked; a probability or weight with which the data item 210 is assigned to a cluster: information pertaining to the data item 210 or to the cluster to which the data item 210 is assigned, or at least one of a pointer, a link, an index, or a reference to a representation of one or more of said identified signature, said at least one token, said identifier, said centroid, said flag, said probability or weight, or said information.

In an example, the processing device 255 may output a representation of one or more of: a determination whether to assign the data item 210 to at least one cluster, an identifier of a cluster to which the data item 210 is assigned; a centroid of a cluster to which the data item 210 is assigned, a member of a cluster to which the data item 210 is assigned, or information pertaining to the data item 210 or to a cluster to which the data item 210 is assigned.

In an example, the processing device 255 may receive one or more of a second data item, a second signature, a second token, or an identifier of a cluster. The processing device 255 may output one or more values retrieved from the memory 250 associated with the second data item, the second signature, the second token, or the identifier of a cluster.

At least a portion of the memory 250 may be organized as one of a hash table, a map, a symbol table, an associative array, or an unordered dictionary data structure.

The processing device outputting one or more cluster identifiers may be further based on factors including at least one of: the number of data items assigned to a cluster, a minimum similarity between the signatures of two data items in a cluster, a minimum similarity between the identified signature and a centroid of a cluster, a density of a cluster, the number of tokens in common between signatures, or the number of elements in the tokens in common between signatures.

The processing device 255 determining similarity between the identified signature and a second signature may be based on a similarity measure of the identified signature to the second signature and on a minimum similarity threshold value. The similarity measure may be at least one of Jaccard similarity, Levenshtein similarity, a Szymkiewicz-Simpson overlap coefficient, mutual similarity, a Sørensen-Dice coefficient, or a Tversky similarity index.

In an example, elements of the identified signature may be equally weighted. In an example, elements of the identified signature may be unequally weighted.

The identified signature may be formed using one or more of term frequency within the data item, term frequency within a corpus, stemming, MinHash, or Bloom filtering.

The processing device 255 may further perform said identifying, said deriving a first size value, said deriving a set of second size values, said generating, for each partial signature said combining, said using, and said determining, and said assigning in a plurality of data items, the data items being presented either as a stream in chronological order of arrival time or as a batch sequentially in any order, regardless of how the order is determined.

The clustering method 1000 may store in memory additional data structures, such as reverse pointers from each cluster identifier to the hash keys under which it is stored in the hash table, to allow execution of these additional steps within linear time in the number of data items.

In an example, there may be multiple MO size values, and there is one MI size value, for a given signature size. Consequently, for each identified signature, each partial signature may be stored once into the hash table, with the one MI size value inserted into an MI token. During the Match-Out stage, a given partial signature may need to be checked in the hash table multiple times, once with each of the MO size values for the identified signature inserted into an MO token.

Practitioners of ordinary skill in the art will recognize that, in an alternative example, the computation of the MO and MI size values can be reversed, and the processing device 255 may adjust accordingly, to produce the same clustering results. That is, the processing device 255 may be modified to use one value, the size of the identified signature, as the MO size value (rather than MI size value), and to allow multiple MI size values (rather than MO size values), representing the possible sizes of other signatures being received that might be similar to the identified signature, in view of the initially configured minimum threshold value, list of allowable signature sizes, and similarity size function. In this modification, a larger number of tokens could be marked in the hash table, but a smaller number would need to be checked for each identified signature. Thus the implementation choice between the two alternatives represents a speed/memory tradeoff.

The processing device 255 may be designed to operate in conjunction with a variety of membership functions, suitable for a variety of applications. A pre-specified membership function may be provided to MIMOSA during initialization. The pre-specified membership function is a set of instructions or module which receives as input the list of matched tokens (if any), and the cluster identifier values associated with those tokens from the hash table. Optionally it may also receive one or both of the identified signature or the list of non-matched tokens (if any), using those items during its operation. It may also have available access to the pre-specified minimum similarity threshold value, list of values for allowable signature sizes, and similarity size function, using those pre-specified items during its operation.

The membership function may determine a cluster for the data item, and assign the identifier of that cluster to the data item by outputting it to the Mark-In stage. Typically a membership function must handle several cases, as in Table 2.

TABLE 2

| Case | Condition | Action |
|---|---|---|
| 1 | None of the tokens was found in the hash table. | Return a new cluster ID value. |
| 2 | One or more of the tokens, all with the same cluster ID, were found in the hash table. | Return the found cluster ID value. |
| 3 | Two or more of the tokens, with two or more cluster ID values, were found in the hash table. | Return the earliest-generated of the found cluster ID values. |

In other examples, the pre-specified membership function may implement different actions, possibly but without limitation one of the following alternatives:

(Case 3): Return the cluster ID of the found cluster whose members' signatures are most similar to the identified signature.

(Case 3): Return the cluster ID of the found cluster with the fewest members.

(Case 3): Return the cluster ID of the found cluster with the most members.

(Case 3): Merge the found clusters into a single cluster, and return the identifier of that cluster.

(Cases 2 and 3): Return nothing. (This would implement a centroid clustering operation in which the first member of a cluster serves as the centroid of the cluster.)

The set of actions implemented by the pre-specified membership function affect the clusters formed by the processing device 255, and their memberships.

Many types of signature are used in similarity clustering. One type is the set of important keywords or key phrases described above. Another example type is the MinHash signature: a signature of k elements can be produced from any data item $D=\{d_1, d_2, \ldots d_n\}$, where $k \leq n$, by applying a hash function h to each member $d_i$ and selecting the k smallest hashed values (Wang et al., 2014). Other types can be created using Bloom filters or Cuckoo hashes (Sanchez D, Yen L, Hill M D, Sankaralingam K (2007), "Implementing signatures for transactional memory," *Proc. 40th Annual IEEE/ACM Int. Symp. Microarchitecture*, 123-133).

In these examples, the dimensionality of each data item is typically reduced in producing the signature. In another example, the signature can be dimension-preserving; the signature can be used to completely reconstruct the data item.

Clustering is related to other data analysis problems, including nearest neighbor search, constrained optimization, graph partitioning, similarity joining, unsupervised classification, and image segmentation. Methods described herein may apply to these other problems as well. For example, self-similarity joining (find all pairs of items in a set that are similar) can be viewed as a subclass of clustering. The result of self-similarity joining is limited to items of the set that are individually similar to at least one other item.

In contrast, clustering does not require that any data item in a cluster be individually similar to any other data item in the cluster. For example, a clustering method may merge two clusters together into a single cluster. This makes it possible for the signatures of certain pairs of items within a cluster to be less similar to each other than the similarity threshold value, or even to have zero similarity. One news story with signature Obama-Announces-Budget-Priorities can be in the same cluster as another story with signature President-Reveals-Spending-Wishlist even though those two signatures have no words in common. For example, they may have been in separate clusters that merged when a story with an overlapping signature such as Obama-Announces-Spending-Wishlist was received. Other stories may be placed into the same cluster, as a result of partial overlap with one or members of the cluster.

Likewise, clustering does not require that two similar data items belong to the same cluster. For example, in splitting a cluster into two clusters, a clustering method may move some similar data items from one cluster into different clusters.

Figures 11A, 11B, 11C:
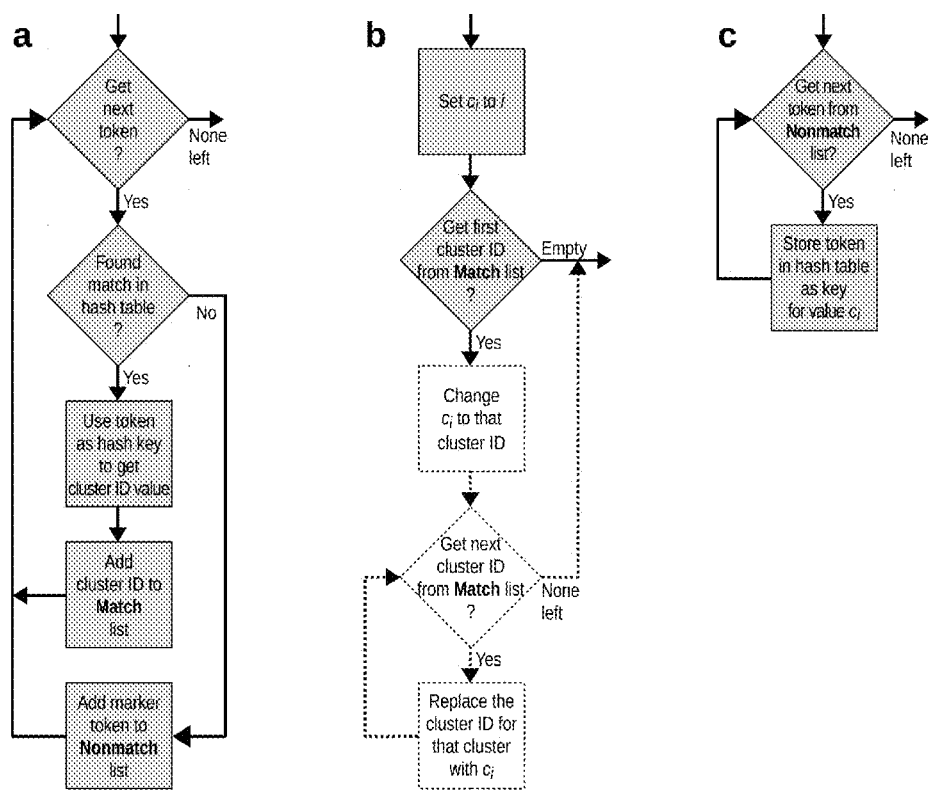
FIG. 11A is a flow diagram illustrating an example of the steps whereby a Match-Out stage of the MIMOSA clustering method may check the tokens in the hash table.
FIG. 11B is a flow diagram illustrating an example of the steps whereby a membership function may determine a cluster identifier to be assigned to each input data item.
FIG. 11C is a flow diagram illustrating an example of the steps whereby a Mark-In stage may store the tokens from a data item into the hash table.

FIGS. 11A-11C are flow diagrams illustrating an example of the processing device 255 of FIG. 2 performing clustering of data items in linear time with error-free retrieval. The method may be performed by a processing device 255 of the clustering server 205 of FIG. 2 and may comprise hardware (e.g., circuitry, dedicated logic, programmable logic, microcode, etc.), software (e.g., instructions run on a processing device), or a combination thereof. In one example, the method may be performed by instructions of a processing device 255 of the clustering server 205 of FIG. 2.

FIG. 11A illustrates an example of the steps whereby a Match-Out stage of the processing device 255 may check the tokens in the hash table. The stage may sequentially process each token. The stage may check whether there are any tokens for the identified signature that have not yet been processed. If so, the Match-Out stage may obtain the next such token and may check it as a hash key in the hash table. If the hash table contains a marker value for the hash key, the Match-Out stage may retrieve the marker value from memory, and add the hash key and its corresponding marker value, as a pair, to a list, called the Match list, in memory. If the hash table does not contain a marker value for the hash key, the Match-Out stage may add the hash key to a second list, called the Nonmatch list, in memory. The Match-Out stage may repeat this process until there are no further unprocessed tokens for the identified signature In this way, the Match-Out stage may build two lists: a Match list comprising the tokens marked as hash keys in the hash table with their corresponding cluster identifier values; and a Nonmatch list comprising the tokens not marked as hash keys in the hash table. The Match-Out stage may assemble these two lists for each identified signature, and may provide them to other stages of the clustering method 1000.

FIG. 11B illustrates an example of the steps whereby a membership function may determine a cluster identifier to be assigned to each data item. The membership function may initially set the cluster identifier $c_i$ for the data item to a value that has not been assigned to another cluster, such as i, which may represent a sequential count of the current number of processed input data items. The membership function may sequentially process each entry in the Match list of FIG. 11A. If the Match list is not empty, then the membership function may change the cluster identifier $c_i$ to the cluster identifier value from the first entry in the Match list. For each additional entry in the Match list, the membership function may cause, via output instructions to the Mark-In stage, the cluster identifier value stored in the hash table under the tokens for the cluster identified by the cluster identifier in that entry to be changed to the value of $c_i$. The membership function may repeat this process until there are no further unprocessed entries in the Match list for the identified signature.

FIG. 11C illustrates an example of the steps whereby a Mark-In stage may store markers for the tokens for an identified signature into the hash table. The Mark-In stage may sequentially process each token. The Mark-In stage may check whether there are any MI tokens for the identified signature that have not yet been processed. If so, the Mark-In stage may obtain the next such token and may store the cluster identifier value $c_i$ from FIG. 11B into the hash table, using the token as hash key. The Mark-In stage may repeat this process until there are no further unprocessed tokens for the identified signature.

In an example, the MIMOSA clustering method 1000 may be repeated with a plurality of minimum similarity threshold values to obtain a hierarchy of clusterings.

In an example, membership of one or more clusters may vary according to factors comprising one or more of: the number of data items in a cluster; a minimum similarity between the signatures of any two data items in a cluster; a minimum similarity between any signature and a centroid of a cluster; a density of a cluster; the number of tokens in common between signatures; or the number of elements in the tokens in common between signatures.

In an example, the processing device may determine a centroid for one or more clusters, and output an identification of the centroid.

In an example, similarity may be computed using a measure that operates on pairs of sets of signatures of differing size. Examples include at least one of Jaccard similarity, Levenshtein similarity, mutual similarity, a Szymkiewicz-Simpson overlap coefficient, a Sørensen-Dice coefficient, or a Tversky similarity index.

In an example, elements of the identified signature may be unequally weighted.

In an example, data items may be permitted to belong to multiple clusters, and two or more clusters of the multiple clusters may have overlapping membership.

In an example, membership within a cluster may be determined probabilistically or by weighting.

In an example, data structures contained within the constant-time key-value memory data structures may be augmented by other data structures to improve performance of storage or retrieval operations on cluster data.

In an example, the identified signature may be formed using one or more of term frequency within the data item, term frequency within a corpus, stemming, MinHash, or Bloom filtering.

In an example, the clustering method 1000 may further comprise the processing device 255 performing one or more of similarity self-joining, similarity joining, constrained optimization, graph partitioning, unsupervised classification, or segmentation of elements of a representation of an image.

In an example, generating the one or more partial signatures may comprise generating a set of combinations of signature elements of the data item such that any data item that is similar with respect to a fixed minimum threshold value shares at least one token.

More particularly, MIMOSA begins with a similarity size function $\hat{s}(\ )$, based on a set-similarity measure. The similarity size function outputs the similarity score for two signatures, where one of the signatures comprises $n_{MarkIn}$ elements, the other signature comprises $n_{MatchOut}$ elements, and the two signatures have $n_{Overlap}$ elements in common.

For example, the similarity size function for the Cosine set-similarity measure $s(X,Y)=|X \cap Y|/\sqrt{|X| \cdot |Y|}$ is $$\hat{s}(n_{MarkIn}, n_{MatchOut}, n_{Overlap}) = n_{Overlap}/\sqrt{n_{MarkIn} \cdot n_{MatchOut}}.$$

There is a one-to-one correspondence between a similarity measure $s(\ )$ and a similarity size function $\hat{s}(\ )$:

$n_{MarkIn}$ takes the place of $|X|$;
$n_{MatchOut}$ takes the place of $|Y|$; and
$n_{Overlap}$ takes the place of $|X \cdot Y|$.

The similarity size function $\hat{s}(\ )$ is used in this analysis because it allows the size relationships to be specified without requiring that actual sets X and Y be known.

MIMOSA further begins with a minimum similarity threshold $\theta$, the desired value of $\hat{s}(\ )$ at which two data item signatures may be considered to belong to the same cluster, $0 \le \theta \le 1$.

A similarity size function can be used to identify constraints that exist on the sizes of signatures and partial signatures. For example, the assumption that the similarity between two signatures must meet the minimum similarity threshold value can be expressed as:

$$\hat{s}(n_{MarkIn}, n_{MatchOut}, n_{Overlap}) \ge \theta.$$

Then given a particular similarity size function, such as the Cosine similarity size function, this relation becomes:

$$n_{Overlap}/\sqrt{n_{MarkIn} \cdot n_{MatchOut}} \ge \theta.$$

If any three of the four variables in this relation are known, then constraints on the fourth variable can be deduced. For example, suppose that $n_{MarkIn}$, $n_{MatchOut}$, and $\theta$ are known. Then the relation can be algebraically rewritten as:

$$n_{Overlap} \ge \theta \cdot \sqrt{n_{MarkIn} \cdot n_{MatchOut}}.$$

More concretely, if $n_{MarkIn}=10$, $n_{MatchOut}=10$, and $\theta=0.6$, then it can be deduced that $n_{Overlap} \ge 6$. MIMOSA may use such constraints, for example to reduce the number of tokens by eliminating partial signatures of fewer than 6 elements.

MIMOSA further begins with a list A of the allowable sizes of (number of elements in) input data item signatures. For example, if signatures are allowed to have 5-8 elements, then $A=\{5,6,7,8\}$.

MIMOSA further begins with a hash table H and a hash function $h(\ )$ for insertion and retrieval of a hash value in H, using a hash key. As is typical for hash functions, when retrieval is attempted for a key k for which no value is present in H, $h(k)$ may output a null value, and it may be written as $h(k) \notin H$.

MIMOSA further begins with a signature function $E(\ )$, which identifies a signature $S_i$ from a data item $D_i$.

MIMOSA further begins with a membership function $G(\ )$, which assigns cluster identifier values $c_i$ to each data item $D_i$, in view of $S_i$, $\theta$, A, $\hat{s}(\ )$, and other assigned cluster identifier values $c_k$ and other signatures $S_k$ where $1 \le k < i$. $G(\ )$ is the function that decides what to do with the data item (e.g., assign it to a cluster), based on which tokens are marked or not marked.

MIMOSA further begins with an ordering function $o(\ )$, which determines a sequence, $(D_1, \ldots, D_i \ldots )$, of the data items. For online clustering, $o(\ )$ is typically chronological order. For batch clustering, $o(\ )$ may be random or pseudo-random, or may be deterministic, based on chronology or other attributes of the data items. Present the data items in the sequence determined by $o(\ )$.

MIMOSA may create a MIMO table during initialization, before receiving any input data. MIMOSA may invoke the similarity size function repeatedly, providing as input all combinations of $n_{MarkIn}$ and $n_{MatchOut}$ sizes in the list A, with all valid $n_{Overlap}$ values in the range of 1 to max(A). For each ($n_{MarkIn}$, $n_{MatchOut}$) combination, MIMOSA may choose the smallest $n_{Overlap}$ value (if one exists) where the similarity score is greater than or equal to the threshold value, and place it into the table, along with the $n_{MarkIn}$ value, at the ($n_{MarkIn}$, $n_{MatchOut}$) grid position. If no such value exists, MIMOSA may leave the ($n_{MarkIn}$, $n_{MatchOut}$) grid position empty. So if A={5,6,7,8}, then the MIMO table has rows 5,6,7,8 and columns 5,6,7,8. MIMOSA invokes ŝ( ) repeatedly, with all valid input triples ($n_{MarkIn}$, $n_{MatchOut}$, $n_{Overlap}$), to decide how to fill in the MIMO table.

Let $$L_x = \left\{ \underset{0 < n_{Overlap} \leq max(A)}{\mathrm{argmin}} (\hat{s}(x, n_{MatchOut}, n_{Overlap}) \geq \theta) : n_{MatchOut} \in A \right\}$$

be the set of sizes of partial signatures that may potentially match a signature of size x, in view of θ, A, and ŝ( ). This expression determines what value to put into the MIMO table at each grid coordinate: the smallest $n_{Overlap}$ value that meets the threshold. If two similar signatures of size 8 have 5 elements in common (overlap size=5), then they would also be similar if they had 6, 7, or 8 elements in common. The argmin selects the smallest (5) of these valid overlap sizes. The sets $L_x$ may be precomputed during MIMOSA initialization, as they depend only on the pre-specified θ, A, and ŝ( ), and not on any input data items.

When MIMOSA receives the $i^{th}$ input data item $D_i$, MIMOSA may form a set of partial signatures, each partial signature comprising one combination from the set of combinations $C_i$ of elements $S_{ij}$ of its identified signature $S_i = \{S_{i1}, \ldots, S_{in_i}\} = E(D_i)$:

$$C_i = \bigcup_{j \in L_{n_i}} \binom{S_i}{j}$$

where $n_i \equiv |S_i|$ is the size of (number of elements in) signature $S_i$. $C_i$ is the set of possible partial signatures of the identified signature $S_i$. It is the union of the sets of partial signatures of sizes j, where j is a size of a possible overlap between a signature of size $n_i$ and another signature of any allowable size, such that the two signatures are similar. The set $L_{n_i}$ is all the possible smallest-yet-similar overlap sizes between $S_i$ and another allowable signature. This step is constant-time because the number of combinations in $C_i$ is upper-bounded by a fixed value, as a function of the fixed max(A).

MIMOSA may canonicalize $C_i$ into a set of deterministically created tokens $T_i = \{t_{i1}, \ldots, t_{i\hat{t}_i}\}$. This can be done by writing each $t_{ij}$ as a sorted list of signature elements, concatenated together with a separator:

$$t_{ij} = C_{iP_1} \circ \ldots \circ C_{iP_{ni}}$$

where

∘ represents a separator character, and ($P_1, \ldots, P_{n_i}$) is a permutation of (1, . . . , $n_i$) such that $C_{iP_j} < C_{iP_k}$ only if $P_j < P_k$.

This expresses the concept of "sorted." The sorting, if needed, is a constant-time step, because the size of $T_i$ is upper-bounded by a fixed value, as a function of the fixed max(A), and the number of signature elements in each $S_i$ is upper-bounded by max(A). The sorting step may not be needed; the elements of the identified signature may already appear in a sorted order within the data item.

For each token $t_{ij}$, the Match-Out stage of MIMOSA may check whether ∃k,l with k<i such that $h(y_{kl} \circ t_{ij}) \in H$, where $y_{kl} \in \{y \in A: \hat{s}(y, n_i, |t_{ij}|) \geq \theta\}$ is a numerical value that could represent the size of another signature $S_k$ such that $s(S_i, S_k) \geq \theta$. In other words, the Match-Out stage puts a size value ($y_{kl}$) into a token and checks the token as a hash key in the hash table. The size value in the token is the size of another signature that could be similar to the identified signature. The Match-Out stage may do this efficiently by obtaining the applicable size values ($y_{kl}$) from the MIMO table, given $n_i$ and $|t_{ij}|$, checking each of the MO tokens $y_{kl} \circ t_{ij}$ as keys in H, and, if a marker $h(y_{kl} \circ t_{ij})$ is found, retrieving the stored marker value. The token can be found only if there is a match both of the size value and of the partial signature. Using the hash table H, each such MO token check is a constant-time step. The set of MO token checks for each token $t_{ij}$ is also a constant-time series of steps, because the number of them is upper-bounded by max(A). The set of token checks for each data item is also a constant-time series of steps, because the number of them, $\hat{t}_i$, is upper-bounded by a fixed value, as a function of the fixed max(A).

The Match-Out stage of MIMOSA may form two sets $g_i^{Match} = \{(y_{kl} \circ t_{ij}, h(y_{kl} \circ t_{ij})) : h(y_{kl} \circ t_{ij}) \in H\}$, called the Match list, and $g_i^{Nonmatch} = \{y_{kl} \circ t_{ij} : h(y_{kl} \circ t_{ij}) \notin H\}$, called the Nonmatch list.

MIMOSA may apply the membership function to one or more of the Match list, the Nonmatch list, and the identified signature: $G(g_i^{Match}, g_i^{Nonmatch}, S_i)$. The membership function may receive and use one or more of the Match list, the Nonmatch list, and the signature, to determine how to assign the data item to a cluster.

Let $M_i = \{m : \exists k : (k,m) \in g_i^{Match}\}$ be the list of all cluster ID values found for $S_i$ in H. If $|M_i|=0$ (none of the MO tokens was marked in the hash table), an example G( ) may assign the cluster ID $c_i = i$. This would assign the data item to a new cluster.

If $|M_i|=1$ (exactly one cluster ID was found), an example G( ) may assign $c_i = k$, where $k \in M_i$ is the found cluster ID. This would assign the data item to an existing cluster.

If $|M_i|>1$ (cluster IDs $M_i = \{k_1, \ldots, k_{\hat{k}}\}$ for more than one cluster containing a member similar to $S_i$ were found), then an example G( ) may assign the lowest (earliest) cluster ID: $c_i = \min(M_i)$. This would choose one of the existing clusters and assign the data item to it.

To record the cluster ID assigned by G( ), the Mark-In stage of MIMOSA may insert the assigned cluster ID value $c_i$ into H as a hash value under each of the MI tokens $n_i \circ t_{iq}$ as hash keys, where $t_{iq} \in L_{n_i}$. In other words, MIMOSA effects the cluster assignment by storing values into the hash table. These hash insertions together are a constant-time step, because the number of them, $\hat{t}_i$, is upper-bounded by a fixed value, as a function of the fixed max(A).

MIMOSA may optionally set a reverse mapping R in memory, from $c_i$ to the markers for each of its constituent signature MI tokens $z_{ij} \circ t_{ij}$, so that $z_{ij} \circ t_{ij} \in R(c_i)$ if and only if $h(z_{ij} \circ t_{ij}) = c_i$. The reverse mapping may be a set of pointers from the representation of the cluster to each of the markers belonging to the members of the cluster. The reverse mapping would let MIMOSA quickly find all of the members of a given cluster, and all of their markers. Such pointers would be useful for applications in which MIMOSA may need to change the cluster to which a data item is assigned—e.g., for merging or splitting a cluster. This is a constant-time step because the number of operations is upper-bounded by a function of the fixed max(A).

It should be noted that the dimensionality of MIMOSA clustering is arbitrarily high. As illustrated, the symbols representing each signature element can be any string—and there is no limit on how many such symbols may exist across all signatures. Moreover, the number of possible symbols does not need to be known at any stage. Each data item is represented by an identified signature of at most max(A) elements, which typically would correspond to the largest or most significant max(A) dimensions for each data item, as effected by the signature generation process.

MIMOSA achieves linear time-complexity and linear space-complexity by capping the number of dimensions per element to max(A), while allowing any number of dimensions per data set. MIMOSA is suitable for clustering applications where the values of $max(A)$ and $\theta$ can be chosen to yield a manageable number $\hat{T}$ of marker tokens, where $\hat{T} \leq \Sigma_i |T_i|$, to fit in available memory or storage resources.

It may be further noted that MIMOSA is straightforwardly parallelizable and scalable—for example, via a map-reduce framework in which the hash table is partitioned and distributed across multiple computers.

Figure 12A:
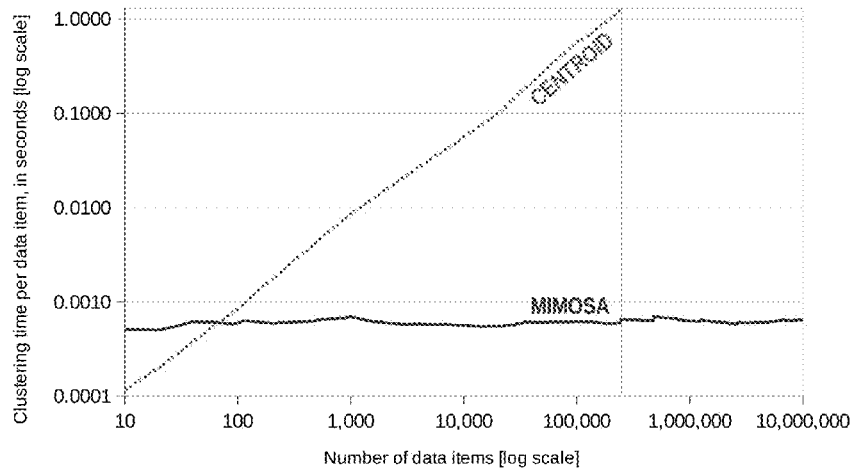
FIG. 12A graphs clustering time per data item, comparing the results of a run of an implementation of MIMOSA and a run of an implementation of a standard centroid clustering algorithm.
Figure 12B:
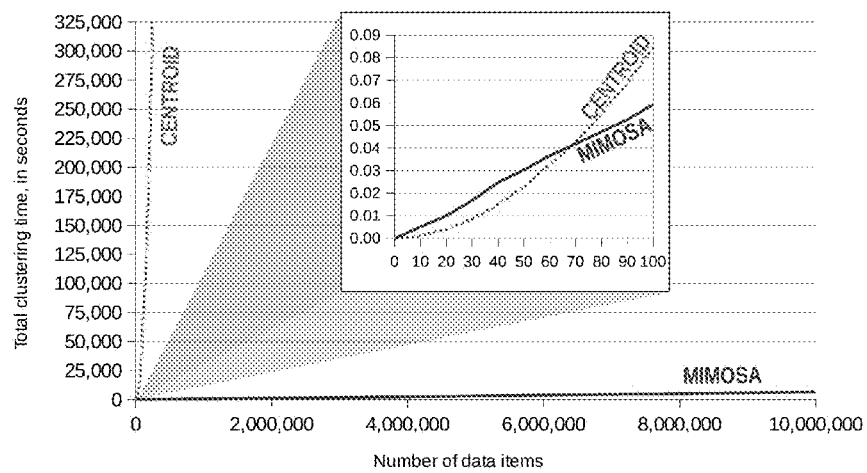
FIG. 12B graphs cumulative total clustering time, comparing the results of a run of an implementation of MIMOSA and a run of an implementation of a standard centroid clustering algorithm.

FIGS. 12A and 12B compare the performance of an implementation of MIMOSA and an implementation of a standard centroid clustering algorithm. In the standard centroid algorithm, the similarity of the identified signature of each data item to the signature of one designated item, termed the centroid item, from each existing cluster, is computed. As additional data items are received, the number of clusters tends to increase. Consequently, as each additional data item is received, the standard centroid clustering algorithm takes longer to compare the item to all existing cluster centroid items.

For a fair benchmark, both implementations were developed in the same programming language, used a single running thread, used the same Jaccard similarity measure, were run on the same computer, and received the same input data. No other application jobs were run on the computer during the measurements. The computer had 96 gigabytes of random access memory.

The input data items in this run were a set of 10,000,000 news articles, commercially syndicated around November 2015 from several thousand news providers. Prior to and separate from clustering, a signature was computed for each article, comprising up to 10 key terms that were chosen to characterize the content and topic of the article. The elements of each signature were provided in a lexicographically sorted order.

In the MIMOSA implementation of FIGS. 12A-12B, the hash table was initially empty. The program formed, checked, and inserted tokens in the hash table on the fly as each input data item was received. The population of tokens into the hash table created a quick-lookup data structure, allowing each successive data item to be compared for similarity with all other data items in the data structure, within a fixed, constant time. The timings reported in FIGS. 12A-12B represent the full activity of MIMOSA, including identifying signatures, generating partial signatures, forming tokens, checking and storing tokens in the hash table, and outputting the assigned cluster identifiers.

Figure 7C:
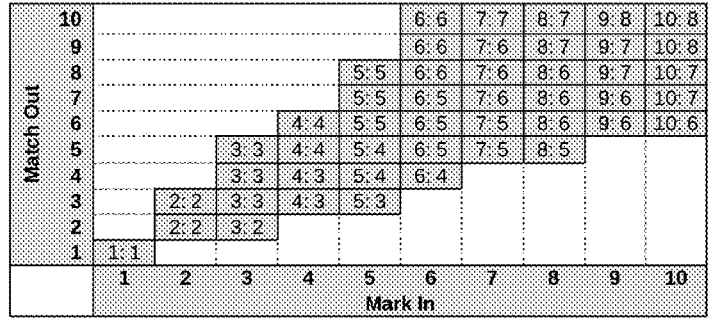
FIG. 7C shows the MIMO table for the MIMOSA clustering run described in FIGS. 12-13.

The centroid algorithm implementation clustered 250,000 data item signatures in 3 days 18 hours 20 minutes 46 seconds, at that point the test of the centroid algorithm was stopped because the results were sufficient for the benchmark. In comparison, the MIMOSA implementation clustered 250,000 data item signatures in 2 minutes 43 seconds—that is, 1,995 times faster. The MIMOSA implementation used the MIMO table shown in FIG. 7C.

MIMOSA continued to cluster the full set of 10,000,000 data item signatures in 1 hour 47 minutes 37 seconds.

If the growth of clustering time of the centroid algorithm is modeled as quadratic, the implementation would take an extrapolated $(10,000,000 \times \sqrt{325,246}/250,000)^2$ seconds, or about 16.5 years, for the centroid algorithm to cluster 10,000,000 data items, averaging about 52 seconds per data item. The MIMOSA implementation would thus be about 80,000 times faster than the centroid implementation in clustering 10,000,000 data items.

MIMOSA memory usage is bounded linearly in the number of data items. The total amount of memory that MIMOSA used in clustering 10,000,000 data items grew to 72.3 gigabytes.

FIG. 12A shows a plot of the cumulative average time (in seconds) to cluster each data item, as a function of the number of received data items, on a log-log scale. The clustering time per item for MIMOSA was constant, about 0.00065 seconds per item, regardless of the number of received items. The clustering time per item for the standard centroid clustering algorithm grew linearly, and eventually exceeded 1.3 seconds per item on average, reaching 2.7 seconds per item for the last items in the run.

FIG. 12B shows a linear-scale plot of the total clustering run time for both implementations, as a function of the number of data elements received. An inset in the figure enlarges the plot on the first 100 data items. The centroid algorithm implementation was faster than the MIMOSA implementation until about 70 data items were clustered. The inset also reveals the linear time-complexity of MIMOSA, in comparison to the quadratic time-complexity of the standard centroid clustering method.

Each cluster created in the run comprises a set of news articles that are similar to one another, in that their signatures have several elements in common. In other words, each cluster represents a news topic. A few of the clusters are large (topics with many articles); many are small. Headlines indicating the topics of the largest news clusters from these articles around November 2015 include:

"The suspects linked to the Paris terrorist attacks"
"224 killed in Russian plane crash in Egypt"
"Russia seeks economic revenge against Turkey over jet"

Figure 13:
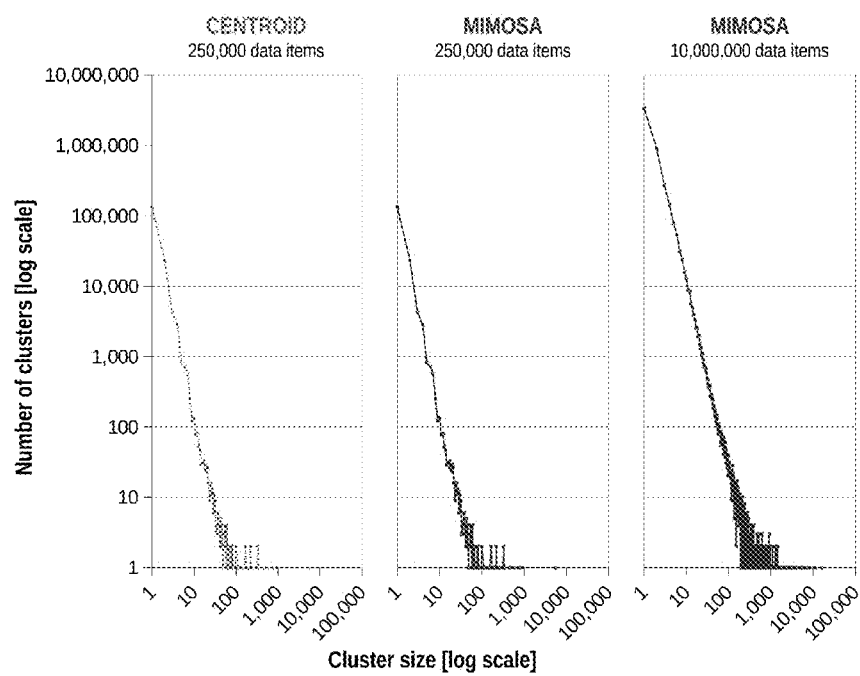
FIG. 13 shows histograms of the sizes of the clusters produced by the centroid implementation and the MIMOSA implementation.

FIG. 13 shows histograms of the sizes of the clusters produced by the centroid implementation and the MIMOSA implementation of FIGS. 12A and 12B. The first two panels show the distribution of cluster sizes that result from running the two implementations on 250,000 data items. The clusters formed are identical in the two implementations—confirming that both solved exactly the same clustering task. The third panel shows the sizes of the clusters that result from continuing the MIMOSA run to 10,000,000 data items. The clusters are generally larger, because of the greater number of data items. The shape of the distribution is similar to that of the shorter clustering run.

Practitioners of ordinary skill in the art will recognize that a MIMOSA can be used in a range of application domains. Such applications may not be commonly called "clustering" within their domains; nevertheless, they involve detecting similarities between data items, discovering groups of data items based on the similarities, assigning data items to the groups, and outputting information that relates to the group assignments. Hence they fall within the spirit and scope of MIMOSA. Such applications may include without limitation the following examples:

Search engines. It is desirable for a webpage search engine or a document search engine to avoid returning near-duplicates among the top results responding to a query. It may do so by arranging the results according to diversity as well as relevance, rather than just relevance alone. MIMOSA can provide such an arrangement: the query results are clustered, and then one representative webpage or document can be returned from each cluster.

Advertising. Advertisers optimize effectiveness by displaying a selection of ads that is customized according to each viewer's likely receptiveness. Web advertisers gather voluminous data about individual viewers' demographic characteristics, browsing behavior, responses to ads, and online purchases. In an example, an advertiser may use MIMOSA on a data set in which each data item represents an individual viewer, and in which each signature element represents an aspect of that viewer's demographics, behavior, responses, and purchases. The result of using MIMOSA on such data may be a set of classes, or clusters, of similar viewers. In deciding whether to show a viewer an ad, the advertiser may classify the viewer, and then use analytics techniques on the responses of similar viewers to estimate effectiveness of the ad.

Social network analysis. Social network companies typically display a content feed, customized for each viewer. Such companies gather voluminous data about each viewer's preferences for types of content, as well as data identifying the viewer's friends or associates. A social network company may optimize its custom content feed display by using MIMOSA to discover groups, or clusters, of viewers who are similar to one another, in terms of content preferences or of friends' content preferences. For a given viewer, it may then display the same or similar content that is preferred by similar viewers.

Topic modeling. A news organization may need an automated way to discover the topics of news events flexibly across a series of evolving news articles. Fixed taxonomic categories, such as "Obama" or "Midwest tornadoes," provide only rigid topic areas and cannot distinguish unanticipated subtopics, such as "Obama library" and "Obama reelection." The organization may use MIMOSA to cluster news articles, and then extract a topic descriptor from each cluster. In an example, the news topic descriptor may be a headline of a centroid article within the cluster. In another example, the descriptor may be a set of signature elements in common among the news articles within the cluster.

Deduplication and data cleaning. Providers of many types of information need to minimize duplication of data. For example, a mailing list provider may aggregate people's names and addresses from many sources. An individual may appear on lists from more than one source, possibly with some variation of name (e.g., with or without middle initial) or address (e.g., $7^{th}$ Ave. versus Seventh Avenue). The provider may wish to clean the lists so that the individual will not receive multiple copies of a mailing. The provider may use MIMOSA to identify clusters of similar data records potentially belonging to the same addressee, suitable for merging.

Database queries. Developers of similarity databases need efficient ways to identify similar data records, in a variety of applications. For example, a similarity database may be used in an application to identify structurally similar chemical compounds, for the purpose of finding alternate compounds to test for desired functional properties. A database in which compounds are described by a signature of structural attributes, or molecular fingerprint, may use MIMOSA to group, or cluster, compounds by similarity, and thereby produce lists of candidates for testing.

Latent class analysis. Medical and public health workers analyze, group, discover, and diagnose cases of disease based on patient data records. A disease may be unknown, yet symptoms and outcomes may be known for a number of patients. MIMOSA may be used to discover latent similarities among patient data records, where signature elements represent symptoms and outcomes. Patients whose records cluster together may have a common syndrome. A diagnostic class of symptoms may be discovered by identifying the most common symptoms within a cluster.

Data reduction. Many data analysis applications benefit from data reduction techniques. In market research, a common technique is to reduce a large surveyed population to a small number of market segments based on demographic, psychographic, or behavioral factors. Market researchers for a supermarket, for example, may give the segments descriptive names, such as: Budget Conscious; Speed Demons; Gourmets; Smart Shoppers; Repeaters; Variety Seekers. A supermarket may use MIMOSA to cluster its customers according to their purchases and shopping behavior, and thereby to discover the most useful segmentations. When the segmentations are combined with a count of the number of customers in each segment, a useful summarization of the customer data set is provided. The supermarket can then design its aisle layout, product offerings, coupon promotions, and the like with reference to the summarized segments, rather than to its entire list of customers.

Dimensionality reduction. Many data analysis applications benefit from reducing the number of dimensions represented by large data sets. In finance and banking, for example, it is desirable to predict corporate distress or bankruptcy, based on categorical data such as sales growth, earnings growth, debt leverage, staffing ratios, collection periods, stock turnover, return on capital, and profit margins. It is desirable to predict personal credit fraud, based on categorical data such as bill payment delays, number of credit accounts, spending behaviors, and purchase types. A financial institution can use MIMOSA to group financial records by similarity, and then within each cluster group, select the features, or signature elements, that are most common among the records. This form of feature selection is a way of identifying the feature dimensions that are most central to a group of records, and concomitantly the feature dimensions that are less important. If credit fraud, or corporate distress, is present in one such record, then the financial institution may examine in greater detail other records having the same central features.

Figure 14:
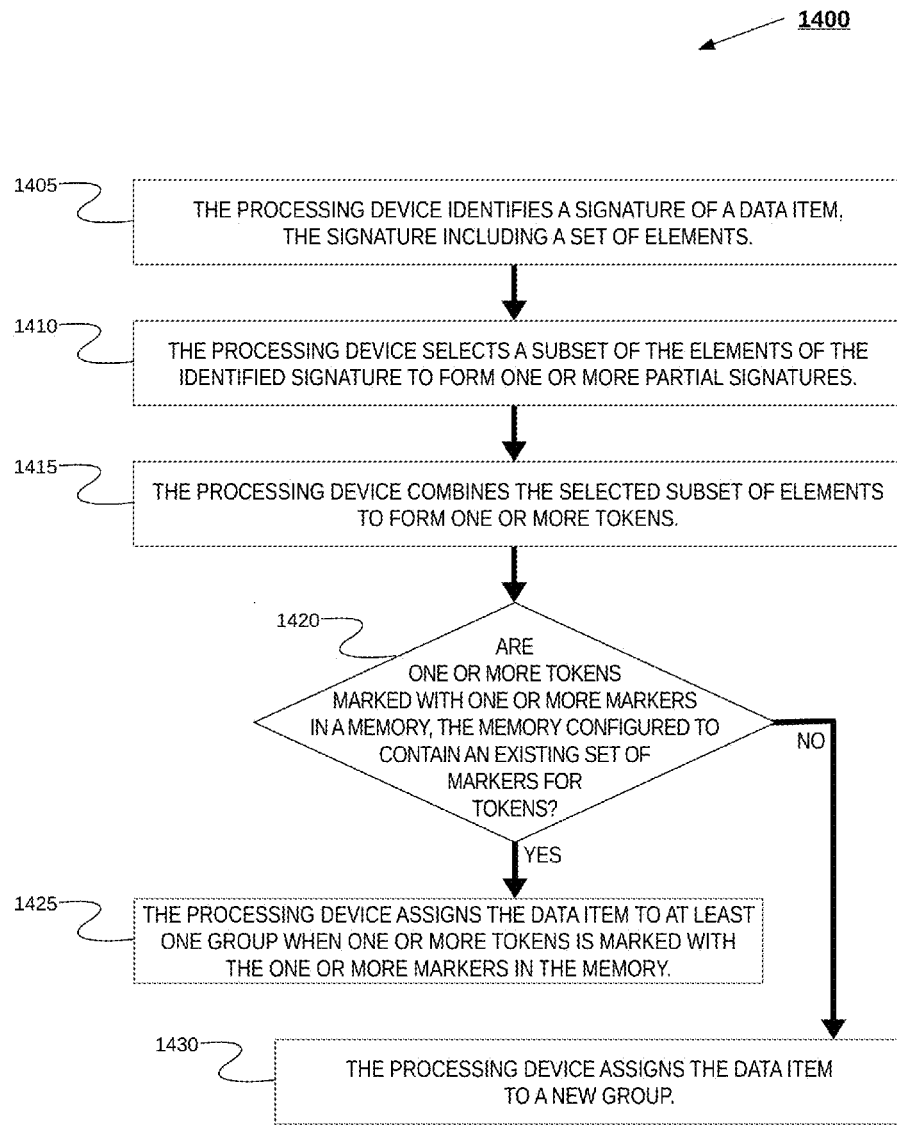
FIG. 14 is a flow diagram illustrating an example of a method for a processing device to group data items of a list of data items.

FIG. 14 is a flow diagram illustrating an example of a method 1400 for a processing device 255 to group data items of a list of data items. The method 1400 may be performed by a processing device 255 of the clustering server 205 of FIG. 2 and may comprise hardware (e.g., circuitry, dedicated logic, programmable logic, microcode, etc.), software (e.g., instructions run on a processing device), or a combination thereof. In one example, the method 1400 may be performed by processing logic 245 associated with a processing device 255 of the clustering server 205 of FIG. 2.

As shown in FIG. 14, at block 1405, the processing device 255 may identify a signature of a data item 210, the signature including a set of elements. At block 1410, the processing device 255 may select a subset of the elements of the identified signature to form one or more partial signatures. At block 1415, the processing device 255 may combine the selected subset of elements to form one or more tokens. At block 1420, the processing device 255 may determine whether the one or more tokens is marked with one or more markers in a memory 250, the memory 250 configured to contain an existing set of markers for tokens. If, at block 1420, the processing device 255 determines that one or more tokens is marked with one or more markers in the memory 250, then at block 1425, the processing device 255 assigns the data item to at least one group when one or more tokens is marked with the one or more markers in the memory 250. If, at block 1420, the processing device 255 determines that no tokens are marked with one or more markers in the memory 250, then at block 1430, the processing device 255 assigns the data item to a new group.

Assigning the data item to at least one group may include marking one or more tokens in the memory 250. Marking one or more tokens in the memory 250 may further include storing one or more marker values for the one or more tokens into the memory 250.

The one or more marker values represent one or more of: a flag value indicating that a token is marked, a token, the identified signature, an identifier of the at least one group to which the data item 210 is assigned, a centroid of the at least one group to which the data item 210 is assigned, information pertaining to the data item 210, information pertaining to the at least one group to which the data item 210 is assigned, or at least one of a pointer, a link, an index, or a reference to a representation of one or more of said flag value, said token, said identified signature, said identifier, said centroid, said information pertaining to the data item 210, or said information pertaining to the at least one group.

The memory 250 may be further configured to contain an existing set of markers for the one or more tokens as one or more values in key-value pairs. Marking the one or more tokens in the memory 250 may further include storing a marker into the memory 250 as a value with a token as a key in a key-value pair.

The processing device 255 may further output a representation of one or more of: a determination of whether to assign the data item 210 to at least one group, an identifier of the at least one group to which the data item 210 is assigned, a centroid of the at least one group to which the data item 210 is assigned, a member of the at least one group to which the data item 210 is assigned, information pertaining to the data item 210, or information pertaining to the group to which the data item 210 is assigned.

Assigning the data item 210 to at least one group may be further based on the one or more values of one or more markers in the memory.

In an example, the data item 210 may be assigned to an existing group identified by the one or more markers.

In an example, the processing device 255 may identify a set of groups based at least in part on similarity of data items of the list of data items. The processing device 255 may assign data items of the list of data items to the one or more groups based at least in part on similarity of the data items assigned to each group of the one or more groups. The processing device 255 may output a representation of the assignment of data items to one or more groups.

In an example, processing device 255 may cluster the data items, categorize the data items, classify the data items, similarity join the data items, latent class analyze the data items, de-duplicate the data items, data clean the data items, data reduce the data items, dimensionality reduce the data items, segment the data items, diversify the data items, model the data items, dimension identify the data items, perform said identifying, selecting, combining, determining, and assigning, the data items being presented either as a stream in chronological order of arrival time or as a batch sequentially in any order, regardless of how order is determined, or repeatedly perform said identifying, selecting, combining, determining, and assigning, with a plurality of minimum similarity threshold values to obtain a hierarchy of groupings.

In an example, a data item may represent one or more of: a webpage, a document, a news article, a person, an image, a demographic profile, a behavioral profile, a purchase record, a viewer of an advertisement, a shopper, a social network profile, a content preference profile, an address record, a material substance profile, a patient health record, a survey record, a company profile; or a credit profile.

In an example, assigning the data item to at least one group may further include the processing device 255 avoiding near-duplicate entries in search engine responses, selecting an advertisement to show to a viewer, selecting content to show to a viewer, finding similar users based on their social network similarity, identifying classes of similar content based on preferences of similar users, extracting a descriptor of the topic of an article or document, de-duplicating similar entries of a mailing list, filling in missing values of data records, discovering disease syndromes, identifying market segments of customers, predicting credit fraud, or predicting financial distress or bankruptcy.

In an example, combining the elements of the one or more partial signatures may further include the processing device 255 concatenating the selected elements with a separator to form a string. Combining the elements of the one or more partial signatures may be based on a sorted representation of the said elements. In an example, assigning the data item to at least one group may further include the processing device 255 determining whether to merge two or more groups into one group, based on whether the at least one token matches two or more tokens present in the memory, the two or more tokens being stored in the memory with two or more associated values identifying the two or more groups. Assigning the data item to at least one group may further include the processing device 255 determining whether to split a group into two or more groups. Assigning the data item to at least one group may be further based on factors including at least one of: the number of data items assigned to the at least one group, a minimum similarity between the signatures of two data items in a group, a minimum similarity between the identified signature and a centroid of a group, a density of a group, the number of tokens in common between signatures, or the number of elements in the tokens in common between signatures. Assigning the data item to at least one group may further depend on determining whether the identified signature is similar to a signature from which the at least one token present in the memory is formed.

In an example, selecting a subset of the elements may be based on a similarity measure of the identified signature to a second signature and on a minimum similarity threshold value. The similarity measure may be at least one of Jaccard similarity, Levenshtein similarity, a Szymkiewicz-Simpson overlap coefficient, mutual similarity, a Sørensen-Dice coefficient, or a Tversky similarity index. Selecting a subset of the set of elements may be based on a set of sizes of signatures, the set of sizes containing a maximum size value representing the largest number of elements in a signature.

In an example, the processing device 255 may identify a first size value, the first size value being the number of elements of the identified signature. The processing device 255 may identify a second size value, the second size value being the number of elements of a second signature that is similar to the identified signature.

In an example, the processing device 255 may segregate the memory into a plurality of sections of memory. At least one section of the plurality of sections is identified by a size value. Determining whether the one or more tokens is present in the memory 250 further include the processing device 255 determining whether the one or more tokens is present in a section of the memory 250 identified by a size value, the size value being one of either the first size value or the second size value.

The processing device may store the one or more tokens into a section of the memory identified by a size value, the size value being one of either the first size value or the second size value.

Combining the elements of the one or more partial signatures into one or more tokens may further include the processing device 255 combining a size value into the one or more tokens, the size value being one of either the first size value or the second size value.

The number of elements in the partial signature may be the smallest number of elements in common between a first signature having the first size value and a second signature having the second size value that is similar to the first signature.

Figure 15:
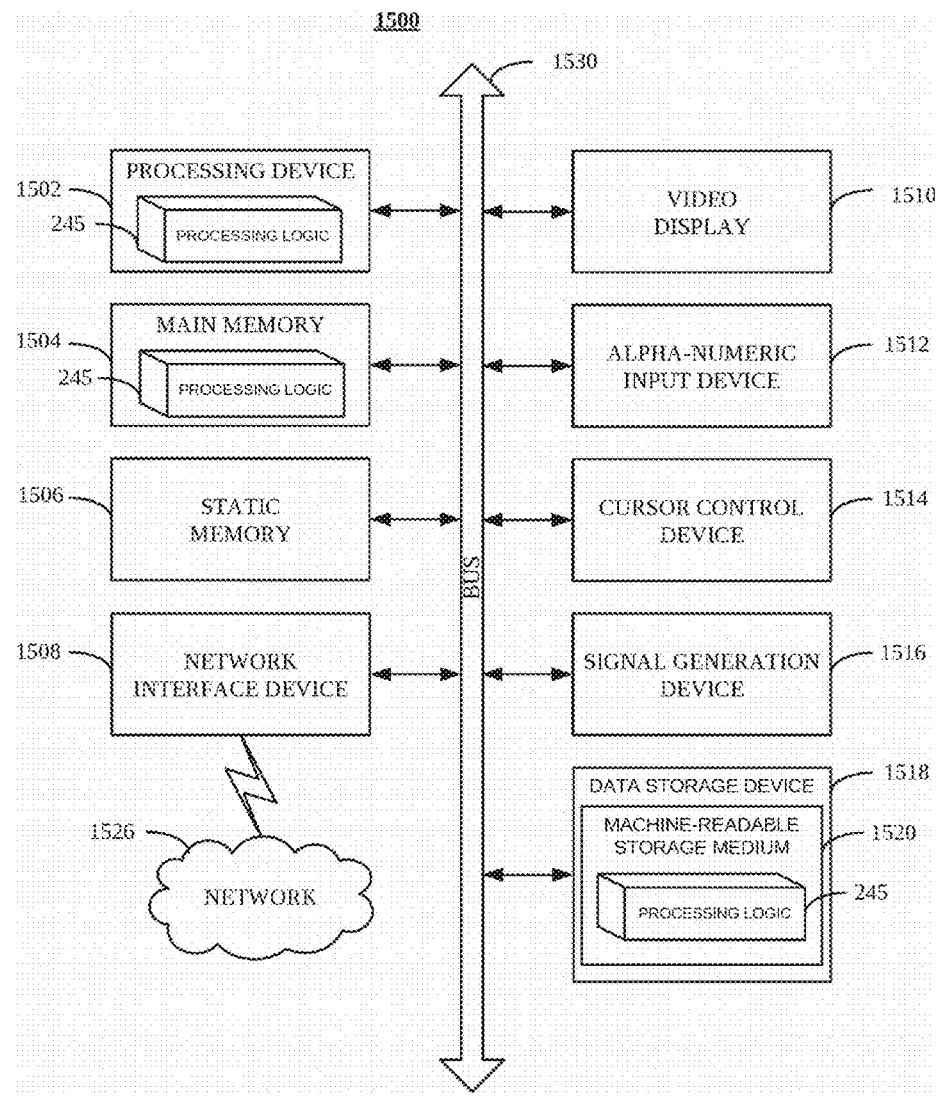
FIG. 15 illustrates a diagrammatic representation of a machine in the exemplary form of a computer system within which a set of instructions, for causing the machine to perform any one or more of the methodologies discussed herein, may be executed.

FIG. 15 is a diagrammatic representation of a machine in the exemplary form of a computer system 1500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1500 includes a processing device 1502, a main memory 1504 (e.g., read-only memory (ROM), flash memory, dynamic random access memory (DRAM) (such as synchronous DRAM (SDRAM) or Rambus DRAM (RDRAM), etc.), a static memory 1506 (e.g., flash memory, static random access memory (SRAM), etc.), and a data storage device 1518, which communicate with each other via a bus 1430.

Processing device 1502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. Processing device 1502 is configured to execute processing logic 245 for performing the operations and steps discussed herein.

Computer system 1500 may further include a network interface device 1508. Computer system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), and a signal generation device 1516 (e.g., a speaker).

Data storage device 1518 may include a machine-readable storage medium (or more specifically a computer-readable storage medium) 1520 having one or more sets of instructions embodying any one or more of the methodologies of functions described herein. Processing logic 245 may also reside, completely or at least partially, within main memory 1504 and/or within processing device 1502 during execution thereof by computer system 1500; main memory 1504 and processing device 1502 also constituting machine-readable storage media. Processing logic 245 may further be transmitted or received over a network 1526 via network interface device 1508.

Machine-readable storage medium 1520 may also be used to store the processing logic 245 persistently. While machine-readable storage medium 1520 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method for a processing device to determine whether to assign a data item to at least one cluster of data items, comprising:
    identifying a signature of the data item, the identified signature including a set of elements;
    deriving a first size value, the first size value being the number of elements of the identified signature based on a set of size values of signatures that includes a maximum size value;
    deriving a second size value based on the set of size values of signatures;
    selecting a subset of the set of elements of the identified signature to form at least one partial signature of the identified signature wherein the number of elements in the at least one partial signature represents the number of elements in common between the identified signature having the first size value and a second signature having the second size value and being similar to the identified signature, wherein the second signature is of an anticipated second data item;
    combining the selected subset of elements into at least one token;
    determining whether the at least one token is present in a memory, the memory configured to contain an existing set of tokens;
    determining whether to assign the data item to at least one cluster based on whether the at least one token is present in the memory; and
    performing said deriving a first size value, said deriving a second size value, said selecting, said combining, said determining whether the at least one token is present in a memory, and said determining whether to assign the data item to at least one cluster, with one or more minimum similarity threshold values, to obtain one or more clusterings.

2. The method of claim 1, wherein determining whether to assign the data item to at least one cluster is based on whether the at least one token is absent from the memory.

3. The method of claim 1, further comprising:
    storing the at least one token into the memory.

4. The method of claim 3, further comprising:
    storing a value associated with the at least one token into the memory, wherein the value represents one or more of:
        the identified signature;
        the at least one token;
        an identifier of a cluster to which the data item is assigned;
        a centroid of a cluster to which the data item is assigned;
        a flag value indicating that the token is marked;
        a probability or weight with which the data item is assigned to a cluster;
        information pertaining to the data item or to a cluster to which the data item is assigned; or
        at least one of a pointer, a link, an index, or a reference to a representation of one or more of said identified signature, said at least one token, said identifier, said centroid, said flag, said probability or weight, or said information.

5. The method of claim 4, further comprising
outputting a representation of one or more of:
    a determination whether to assign the data item to at least one cluster;
    an identifier of a cluster to which the data item is assigned;
    a centroid of a cluster to which the data item is assigned;
    a member of a cluster to which the data item is assigned; or
    information pertaining to the data item or to a cluster to which the data item is assigned.

6. The method of claim 4, wherein storing a value associated with the token into the memory further comprises storing the token as a key with the associated value, as a key-value pair.

7. The method of claim 1, further comprising:
receiving one or more of a second data item, a second signature, a second token, or an identifier of a cluster; and
outputting one or more values retrieved from the memory associated with the second data item, the second signature, the second token, or the identifier of a cluster.

8. The method of claim 1, wherein at least a portion of the memory is organized as one of a hash table, a map, a symbol table, an associative array, or an unordered dictionary data structure.

9. The method of claim 1, wherein combining the elements of the at least one partial signature further comprises:
concatenating the selected elements with a separator to form a string.

10. The method of claim 1, wherein combining the elements of the at least one partial signature is based on a sorted representation of the said elements.

11. The method of claim 1, wherein determining whether to assign the data item to at least one cluster further comprises:
determining whether to merge two or more clusters into one cluster, based on whether the at least one token matches two or more tokens present in the memory, the two or more tokens being stored in the memory with two or more associated values identifying the two or more clusters.

12. The method of claim 1, wherein determining whether to assign the data item to at least one cluster further comprises:
determining whether to split a cluster into two or more clusters.

13. The method of claim 1, wherein determining whether to assign the data item to at least one cluster is further based on factors including at least one of:
the number of data items assigned to a cluster,
a minimum similarity between the signatures of two data items in a cluster,
a minimum similarity between the identified signature and a centroid of a cluster,
a density of a cluster,
the number of tokens in common between data items assigned to a cluster, or
the number of elements in the tokens in common between data items assigned to a cluster.

14. The method of claim 1, wherein the determining whether to assign the data item to at least one cluster further depends on determining whether the identified signature is similar to a signature from which the at least one token present in the memory is formed.

15. The method of claim 1, wherein selecting a subset of the set of elements of the identified signature to form at least one partial signature is based on a similarity measure of the identified signature to a second signature and on a minimum similarity threshold value.

16. The method of claim 15, wherein the identified signature and the second signature have at least one token in common when they are similar.

17. The method of claim 15, wherein the similarity measure is at least one of Jaccard similarity, Levenshtein similarity, a Szymkiewicz-Simpson overlap coefficient, mutual similarity, a Sørensen-Dice coefficient, or a Tversky similarity index.

18. The method of claim 1, further comprising segregating the memory into a plurality of sections of memory, wherein at least one section of the plurality of sections is identified by a size value, and wherein determining whether the at least one token is present in the memory further comprises determining whether the at least one token is present in a section of the memory identified by a size value, the size value being one of either the first size value or the second size value.

19. The method of claim 1, further comprising:
storing the at least one token into a section of the memory identified by a size value, the size value being one of either the first size value or the second size value.

20. The method of claim 1, wherein combining the elements of the at least one partial signature into at least one token further comprises combining a size value into the at least one token, the size value being one of either the first size value or the second size value.

21. The method of claim 1, wherein the number of elements in the partial signature is the smallest number of elements in common between a first signature having the first size value and a second signature having the second size value that is similar to the first signature.

22. The method of claim 1, wherein elements of the identified signature are equally weighted.

23. The method of claim 1, wherein elements of the identified signature are unequally weighted.

24. The method of claim 1, wherein the identified signature is formed using one or more of term frequency within the data item, term frequency within a corpus, stemming, MinHash, or Bloom filtering.

25. The method of claim 1, further comprising performing said deriving a first size value, said deriving a second size value, said selecting, said combining, said determining whether the at least one token is present in a memory, and said determining whether to assign the at least one data item to at least one cluster in a plurality of data items, in a serial mode or a batch mode.

26. A system for determining whether to assign a data item to at least one cluster of data items, comprising:
a memory; and
a processing device, coupled to the memory, to:
identify a signature of the data item, the identified signature including a set of elements;
derive a first size value, the first size value being the number of elements of the identified signature based on a set of size values of signatures that includes a maximum size value;
derive a second size value based on the set of size values of signatures;
select a subset of the set of elements of the identified signature to form at least one partial signature of the identified signature wherein the number of elements in the at least one partial signature represents the number of elements in common between the identified signature having the first size value and a second signature having the second size value and being similar to the identified signature, wherein the second signature is of an anticipated second data item;
combine the selected subset of elements into at least one token;
determine whether the at least one token is present in a memory, the memory configured to contain an existing set of tokens;
determine whether to assign the data item to at least one cluster based on whether the at least one token is present in the memory; and
perform said deriving a first size value, said deriving a second size value, said selecting, said combining, said determining whether the at least one token is present in a memory, and said determining whether to assign the data item to at least one cluster, with one or more minimum similarity threshold values, to obtain one or more clusterings.

27. A non-transitory computer readable storage medium including instructions that, when executed by a processing device, cause the processing device to determine whether to assign a data item to at least one cluster of data items, the processing device further to:
- identify a signature of the data item, the identified signature including a set of elements;
- derive a first size value, the first size value being the number of elements of the identified signature based on a set of size values of signatures that includes a maximum size value;
- derive a second size value based on the set of size values of signatures;
- select a subset of the set of elements of the identified signature to form at least one partial signature of the identified signature wherein the number of elements in the at least one partial signature represents the number of elements in common between the identified signature having the first size value and a second signature having the second size value and being similar to the identified signature wherein the second signature is of an anticipated second data item;
- combine the selected subset of elements into at least one token;
- determine whether the at least one token is present in a memory, the memory configured to contain an existing set of tokens;
- determine whether to assign the data item to at least one cluster based on whether the at least one token is present in the memory; and
- perform said deriving a first size value, said deriving a second size value, said selecting, said combining, said determining whether the at least one token is present in a memory, and said determining whether to assign the data item to at least one cluster, with one or more minimum similarity threshold values, to obtain one or more clusterings.

* * * * *